United States Patent [19]
Kettler et al.

[11] Patent Number: 5,564,626
[45] Date of Patent: Oct. 15, 1996

[54] CONTROL SYSTEM FOR AIR QUALITY AND TEMPERATURE CONDITIONING UNIT WITH HIGH CAPACITY FILTER BYPASS

[75] Inventors: John P. Kettler, Shawnee; James A. Reese, Overland Park, both of Kans.

[73] Assignee: York International Corporation, York, Pa.

[21] Appl. No.: 379,166

[22] Filed: Jan. 27, 1995

[51] Int. Cl.$^6$ .................................................. F24F 7/00
[52] U.S. Cl. ........................ 236/49.3; 454/229; 55/471
[58] Field of Search ........................ 454/229, 158; 55/467, 212, 215, 312, 314, 471; 95/11, 19, 22; 62/186; 236/49.3

[56] References Cited

U.S. PATENT DOCUMENTS

| | | |
|---|---|---|
| 3,775,949 | 12/1973 | Wachter . |
| 3,841,393 | 10/1974 | Gilles . |
| 4,189,094 | 2/1980 | Robinson . |
| 4,530,735 | 8/1985 | Stiles ........................................ 62/186 |
| 4,558,636 | 12/1985 | Malmstrom ........................... 454/229 |
| 4,895,644 | 1/1990 | Porembski . |
| 4,995,307 | 2/1991 | Floyd . |
| 5,117,899 | 6/1992 | Skimehorn . |
| 5,257,736 | 11/1993 | Roy . |
| 5,279,609 | 1/1994 | Meckler . |
| 5,282,770 | 2/1994 | Shibata . |
| 5,332,151 | 7/1994 | Kwak . |
| 5,333,783 | 8/1994 | Catan . |

FOREIGN PATENT DOCUMENTS 322513  11/1972  U.S.S.R. .

OTHER PUBLICATIONS

1991 ASHRAE Handbook, "Heating, Ventilating, and Air Conditioning Applications", Judi–Pound Edition pp. 41.12–41.3.

*Primary Examiner*—John M. Sollecito
*Attorney, Agent, or Firm*—Kokjer, Kircher, Bowman & Johnson

[57] ABSTRACT

An air conditioning unit is provided with a high capacity filtration system for removing pollutants from supply air, typically return air which has been recirculated from the conditioned area. A filter bypass passage and suitable flow control devices are provided so that supply air, typically fresh outdoor air, may be routed around the filtration system when minimal or no filtration is required. An air quality detector samples the air quality and positions the flow control devices to effect the most cost efficient operation of the air handling unit under the given operating conditions.

13 Claims, 8 Drawing Sheets

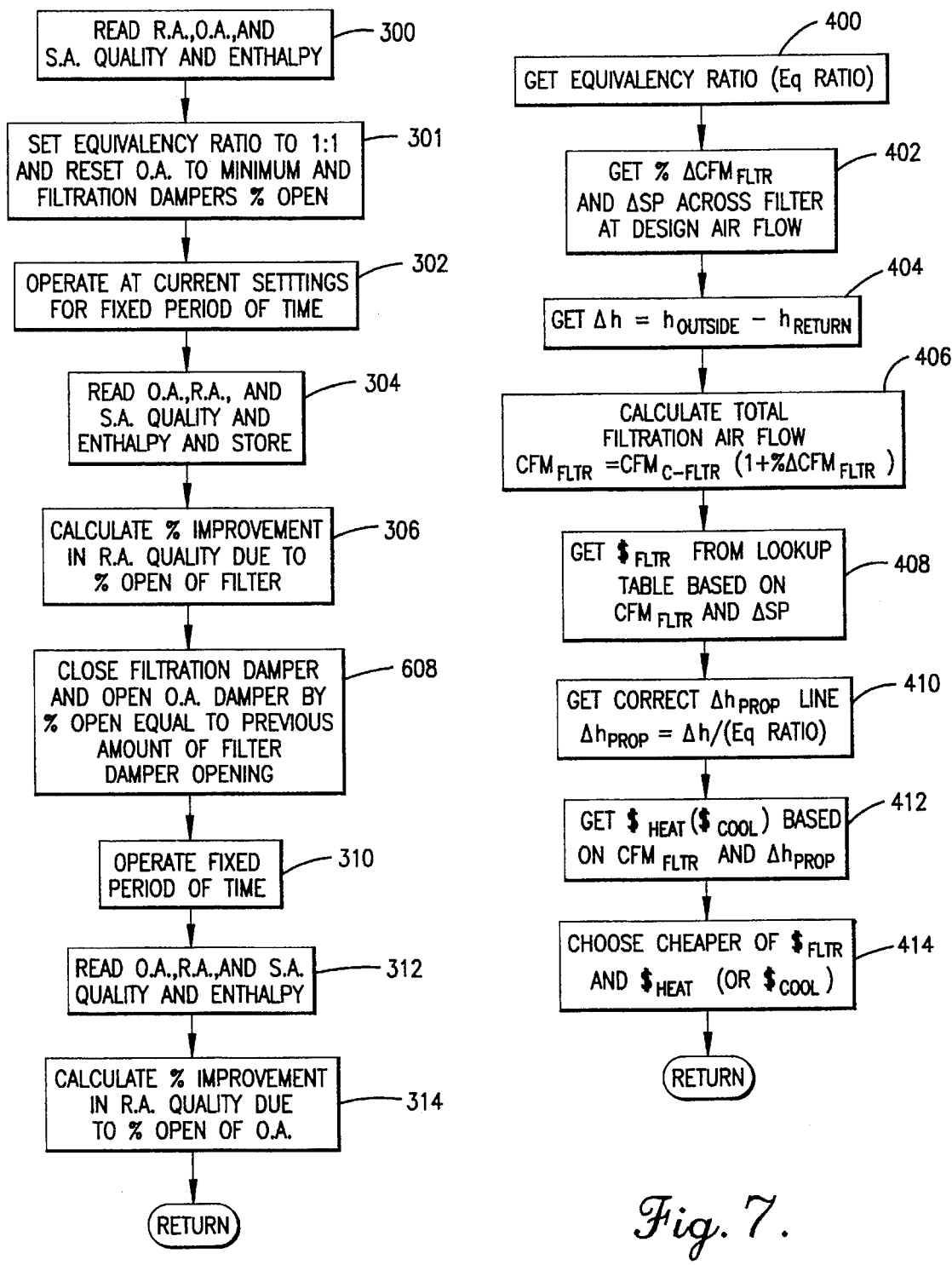

CONTROL SYSTEM FOR AIR QUALITY AND TEMPERATURE CONDITIONING UNIT WITH HIGH CAPACITY FILTER BYPASS

BACKGROUND OF THE INVENTION

This invention relates in general to air conditioning and heating units for supplying conditioned air to the main duct work of large and small buildings and, more particularly, to a unit which contains high capacity filters for removing pollutants from the conditioned air.

Air conditioning and heating units are used to supply temperature conditioned air to the main duct work of buildings. One or more large fans within the unit are used to draw or blow supply air therethrough during which the heating or cooling coils in the unit provide temperature conditioning of the supply air. The supply air may comprise air which is recirculated from the building (i.e., return air), either alone or in combination with fresh air drawn from outside of the building. After the supply air has been heated or cooled, it is then discharged by the fan into the associated air distribution system. In other cases, the fan blows the air through the heating and cooling coils and then into the distribution system.

In addition to providing temperature conditioning of the air, units of this type must also maintain an acceptable level of air quality within the conditioned space. The levels of pollutants such as volatile organic compound and cigarette smoke which are generated within the building are typically controlled by a high capacity filtration system which removes airborne contaminants from the recirculated air. High capacity filtration devices such as mechanical filters and electronic and adsorptive devices are effective at removing undesired pollutants, but also typically cause a significant pressure drop across the filters. In order to compensate for the pressure loss, more fan energy must be utilized, thus significantly increasing the operating costs of the system. Replacement costs of high efficiency filters are higher than replacement costs of lower efficiency media, so action to extend the life of the high efficiency filter will remove system operating costs. The use of these extensive filtration systems has also become more prevalent as a result of increasingly stringent air quality requirements.

For example, in 1989 the Professional Society for Air Conditioning (ASHRAE) changed its ventilation standard by increasing the recommended amount of outside air to be incorporated into a ventilation system. ASHRAE increased the recommended amount by a factor of 4, from 5 cfm (cubic feet per minute) per person to 20 cfm per person for office buildings and from 5 cfm per person to 15 cfm per person in schools. Generally, a conditioning system consumes more energy when processing outside air, such as when changing its temperature, as compared to the energy consumed when processing return air, such as during filtration. Thus, increasing the recommended amount of outside air for use in a ventilation system, ASHRAE similarly increased the energy consumed by the ventilation system. For instance, an air conditioning system for an office building consumes between 10% to 15% more energy when processing 20 cfm per person of outside air, as compared to the energy consumed when processing 5 cfm per person.

The ASHRAE standard provides an alternative to increasing the amount of outside air. This alternative is referred to as the "indoor air quality procedure" (IAQ procedure) and is referred to as "demand control ventilation" (DCV). The IAQ procedure may usually substantially reduce the energy consumption of the conditioning system by allowing for variations in the percentage of outside and return air to be utilized. The IAQ procedure sets maximum contaminant levels acceptable within the occupied space. The DCV system is merely required to maintain contaminant levels within these acceptable maximums without mandating the use of 20 cfm per person of outside air.

The ASHRAE standard has been adopted by many states and national building codes. Presently, additional government agencies are becoming more involved in the regulation of indoor air quality within commercial buildings, and thus interest has increased in the IAQ procedure recommended by ASHRAE.

However, presently a conditioning system does not exist which adequately follows the IAQ procedure to maintain acceptable contaminant levels within a commercial building while minimizing the energy consumption of the conditioning system. In addition, previous systems which have attempted to comply with the IAQ standards have unnecessarily limited the life of the filter media since these foregoing systems draw excessive amounts of return and outside air through the high efficiency filters even when not required by the air quality. This excessive use shortens the high efficiency filter's life and increases the conditioning systems energy consumption. Such energy consumption results from the fact that high efficiency filters cause a substantial pressure drop within air passed therethrough. This pressure drop must be compensated for by the fans within the conditioning system, thereby consuming excess energy.

Moreover, often, fresh outdoor air which is drawn into the unit has a relatively high air quality and does not require the extensive filtering necessary with recirculated air. There are also occasions when the recirculated or return air is of sufficient quality to achieve the desired air quality standards without filtration. However, past systems have not been designed to bypass the filters when the incoming outside and/or return air has acceptable quality. Thus, the extensive filtration systems which are required to achieve necessary filtration at peak filtration loads are also used at non-peak times and thus cause significant unnecessary operating costs at non-peak times.

Finally, past systems have assumed outside air to be good quality and have used more outside air to dilute indoor contaminates without regard to outdoor air quality nor with regard to the cost of heating or cooling this additional outside air. The amount of outside air depends upon the quality thereof and upon the quality of the return air. Thus, maximizing the use of uncontaminated outside air could remove the need to filter the air and reduce filtering cost. However, increasing the amount of outside air may increase the amount of energy consumed to maintain a desired temperature. Thus, the filtering cost must be compared to the increased heating or cooling cost to select the most cost effective solution. Heretofore, no system has addressed these energy consumption concerns.

A need remains within the industry to provide an air conditioning system which overcomes the disadvantages noted above and experienced heretofore. It is an object of the present invention to provide such a system.

SUMMARY OF THE INVENTION

It is an object of the present invention to provide a control system for an air conditioning unit which complies with the IAQ standards by monitoring return and outside air and selectively drawing optimal percentages thereof based on the enthalpy and air quality.

It is a further object of the present invention to provide a control system for an air conditioning unit which minimizes energy consumption and the cost of replacement filters by bypassing the high efficiency filters when the air quality permits while continually meeting the IAQ standards.

It is a further object of the invention to provide a control system for an air conditioning unit with a filtration system which may be utilized to achieve high capacity filtering and which may be bypassed when minimum or no filtration of the supply air is required so that the increased operating costs resulting from the filter system are avoided.

It is also an object of this invention to provide an air conditioning unit having a high capacity filtration system with an air quality sampler so that supply air which requires little or no filtering may be automatically detected and routed to bypass the filtration system, thereby permitting more economical operation of the system by reducing pressure losses in the system.

It is a further object to provide a controller that monitors the outside, return, and supply air quality and when the indoor $CO_2$ level rises above a prescribed level (e.g., 1000 PPM) and the incremental difference between the return air $CO_2$ level and the outdoor air $CO_2$ level rise above a prescribed level (e.g., 500 PPM), the controller increases the outdoor air damper minimum flow to a prescribed occupancy requirement level.

Finally, it is an object to provide a control module that monitors VOC or other specific contaminant levels in indoor and return air and based upon these readings, the control module instigates a control algorithm that compares outdoor and return air enthalpy and VOC levels to determine whether it is feasible to reduce the amount of outdoor air to a minimum and to modulate the dampers open to admit return air to the gas phase or contaminant filter media or, alternatively, to bypass the filter media and to open the outdoor air damper further to dilute the indoor air contaminant level. By adding a flow measurement sensing option, the inventive control system can be expanded to calculate the optimal sequence based on the above variables plus the filtering cost, versus energy cost of heating or cooling the added air brought in for dilution.

To accomplish these and other objects of the invention, a control system is provided for an air conditioning unit with a substantially enclosing housing and inlet and discharge openings in the housing. An internally mounted fan draws outside and return air through the inlet opening to form supply air which passes through a high capacity filtration system and then through a temperature conditioning system and is subsequently discharged through the discharge opening. A bypass passage is provided so that supply air which does not require extensive filtration may be routed around the filtration system. Flow control devices such as air dampers are positioned to block passage of the supply air through the high capacity filters and route the supply air through the bypass. Additional dampers are provided proximate the return and outside air inlets to control the percentage of each within the supply air. The bypass permits the unit to be economically operated without high capacity filtration during periods when the supply air is of sufficient air quality. When filtration is required, the flow control devices are repositioned to block the bypass and route the supply air through the filtration system and to vary the percentages of return and outside air. One or more air quality detectors may be utilized to sample the air quality automatically in order to position the flow control devices.

BRIEF DESCRIPTION OF THE DRAWINGS

Referring now to the drawings in which like reference numerals are used to indicate like parts in the various views:

FIG. 5 illustrates an alternative processing sequence followed during a steady state condition to calculate the equivalency ratio between the percentage change in outside air and the percentage change in filtered air;

FIG. 7 illustrates the sequence followed by the controller to utilize the lookup table of FIG. 6 to calculate cooling/heating costs and filtration costs.

DESCRIPTION OF THE PREFERRED EMBODIMENT

Figure 1:
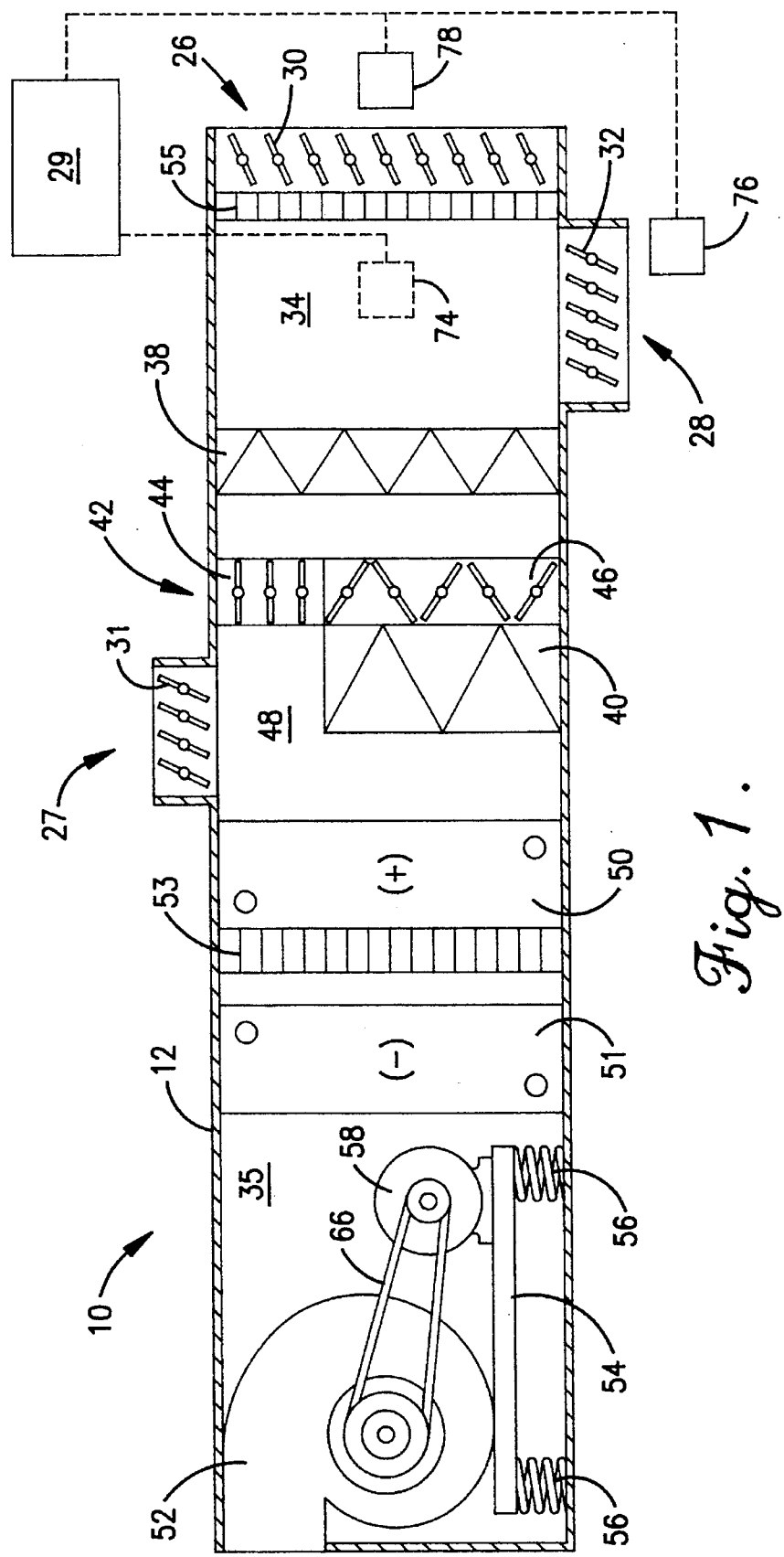
FIG. 1 is a side elevational view of an air conditioning unit of the present invention with portions removed to illustrate details of construction and to show a series of flow control devices positioned to direct the supply air through a high capacity filtration system.

Referring now to the drawings in greater detail, an air conditioning unit is represented broadly in FIG. 1 by the numeral 10. The unit 10 is adapted for coupling with a building air conveyance system to deliver temperature conditioned air to rooms or other areas within the building which are in need of temperature conditioning.

Unit 10 comprises a substantially enclosing housing 12 formed from opposed end walls, vertical side walls, and horizontal walls. An outside air inlet 26 and a return air inlet 28 are positioned in the end wall and the horizontal wall, respectively. Flow control dampers 30 and 32 are associated with inlets 26 and 28, respectively, to regulate the flow of supply air through the inlets. The flow control dampers 30 and 32 are controlled via stepper motors (not shown) which are controlled by a control system (explained in more detail in connection with FIGS. 3A and 3B).

The air inlets 26 and 28 feed outside and return air into an intake chamber 34 which is defined by the housing walls and a flow control device 42. The outside and return air combine to form mixed unprocessed air within the intake chamber 34. A processed chamber 35 is formed adjacent the discharge port downstream of the control device 42 and downstream of the heating and cooling coils 50 and 51. The processed chamber 35 contains processed supply air. A filter 38 is positioned adjacent the inlets 26 and 28 in the intake chamber and is designed for rough screening and removal of large airborne particles from the supply air entering the chamber 34. A high capacity filtration system 40 is positioned downstream from the initial filter 38 and adjacent the control device 42. Many suitable types of mechanical, electronic, adsorptive and other filtration devices (e.g., HEPA filters, carbon filters and the like) may be utilized alone or in combination in the high capacity filtration system 40 and the invention is not limited to any particular type of filter. The high capacity filters may be arranged parallel to one another, in series or in any combination thereof. The filters, however, must provide the necessary filtration capacity to achieve a predetermined air quality under peak load conditions. The high capacity filtration system 40 shown does not completely span the interior cross-sectional area of the chamber 34. Instead, one end of the filtration system 40 forms a passage 48 with the wall of the housing 12 between the intake chamber 34 and the filtered chamber 35. As will be subsequently described, that portion of the interior cross-sectional area not occupied by the high capacity filtration system 40 is available for air flow to bypass the filtration system 40.

Optionally, the filtration system 40 may be configured to span the interior cross-sectional area of the chamber 34. In this instance, a separate external bypass passage would be provided having separate ductwork accepting air from the intake side of the filtration system 40 and returning it to the outlet side thereof. The bypass conduit would include a damper to close the bypass to admit a desired amount of air about the filtration system 40.

Optionally, a second outside air inlet 27 may be provided proximate the downstream side of the high capacity filtration system 40, and the upstream side of the heating and cooling coils 50 and 51. An outside air damper 31 is controlled by the controller 29 to open and close the inlet 27 depending upon the outside air quality. This outside air may or may not require prefiltering before entering the inlet 27. As a further alternative, the outside air inlet 26 may be removed or entirely closed to ensure that only return air passes through the high capacity filtration system 40 while outside air is admitted at inlet 27.

The flow control device 42 is positioned intermediate the initial filter 38 and the high capacity filtration system 40 to direct air flow through or about the filtration system 40. Flow control device 42 includes an upper section 44 (often referred to as a bypass damper) and an independently operable lower section 46 (often referred to as a face damper). The lower section 46 is coextensive with high capacity filtration system 40 and is operable to direct intake air from the intake chamber 34 and through the filtration system 40. Flow control upper section 44 directs intake air from the intake chamber 34 through a passage 48 which bypasses the filtration system 40. The flow control device 42 may comprise any of many suitable types of devices such as dampers (controlled by a stepper motor or other suitable activator) which may be moved between an open position which permits the passage of air streams and a closed position which blocks the air stream flow.

The bypass passage 48 is positioned and configured to minimize pressure drop between the intake and filtered chambers 34 and 35 as air is diverted around the high capacity filtration system 40. In the illustrated embodiment, the bypass passage is positioned above the filtration system, but it is to be understood that the bypass passage 48 may assume other configurations and locations.

Heating and cooling units 50 and 51 are positioned upstream or downstream of the high capacity filtration system 40 to provide for temperature conditioning of the supply air as it passes through the unit. A fan 52 is also positioned internally of housing 12 and is mounted on a platform 54 which is spaced above the horizontal wall by torsion springs 56. The fan 52 includes a motor 58 coupled thereto by a pair of pulleys and a drive belt 66. By way of example only, the fan 52 may be a cage type fan having a discharge end mounted to discharge ductwork in the end of the housing. It is to be understood that other fan configurations may be utilized in place of that illustrated and described. It is also to be understood that the heating and cooling coils, fan and filters may be arranged in any desired order. The mixed air usually passes through a prefilter before contacting the HEPA or high efficiency filter.

The controller 29 may operate the fan 52 as a constant flow system to supply a constant cubic feet per minute (cfm) of air to the building space at all times. Alternatively, the controller 29 and fan 52 may operate as a variable airflow system (VAV) to adjust the total cubic feet per minute (cfm) of air supplied to the building space through the ductwork. If operated as a VAV system, the air flow varies based on system requirements as determined by one or more static sensors in the supply ducts or through monitoring individual zone controllers. Alternatively, additional fans may be used, such as to draw return air out of the building space to an exhaust port outside the building.

Optionally, an air quality detector 74 is positioned internally or externally of housing 12 and is operably coupled with a controller 29 that controls the flow control device 42. Detector 74 may comprise any of various suitable devices which are capable of continuously or intermittently sampling the supply air in order for a controller 29 to determine the level of one or more pollutants, the air flow rate and/or the enthalpy thereof. For example, detectors are available which measure carbon dioxide levels as an indication of air quality. Other detectors may measure the levels of airborne particulate, sulfur dioxide, carbon dioxide, carbon monoxide, various VOCs and the like.

Additional sensors 76 and 78 are provided to sense the air quality, air flow rate, and enthalpy for return air and for outside air. Alternatively, separate sensors may be provided for enthalpy and for air quality. Further, sensors 76 and 78 may be located at various points within the air flow system so long as they accurately register the enthalpy and quality of outside and return air. The sensors 76 and 78 are connected to the controller 29 and deliver control signals thereto representative of the surrounding air's quality and enthalpy. As explained below, the controller 29 adjusts the dampers 26 and 28 and the flow control device 42 to optimize the operation of the air conditioning system.

An air flow measuring station 53 is provided downstream of the point at which the return and outside air combine to form mixed air. The measuring station 53 detects the total air flow through the housing 12 at an instant in time (i.e., the current total $cfm_{MA}$ of mixed air). This measurement is passed to the controller 29. Optionally, a second air flow measuring station 55 may be provided to monitor the current total $cfm_{OA}$ of outside air being drawn into the intake chamber 34. This measurement is also passed to the controller 29.

In operation, the fan 52 directs air through the unit 10 from either or both of the outside air inlet 26 and return air inlet 28. The dampers 30 and 32 associated with the respective inlets may be positioned to permit an influx of only recirculated air or outside air or a mixture of both.

Air entering the intake chamber 34 is initially screened by filter 38 which removes large airborne particles. The intake air next encounters the flow control device 42 and, depending upon the positioning of the flow control upper and lower sections 42 and 44, is directed through either the high capacity filtration system 40 or the bypass passage 48, or both. Air either drawn or blown through the filtration system 40 has undesired pollutants removed therefrom while the air routed through the bypass passage 48 is untreated. Filtered (or unfiltered depending upon the system configuration) air is then heated or cooled by heating or cooling unit 50 and 51 and passed into the discharge chamber 72. The processed supply air is then discharged through the outlet (not shown) and conveyed by the building duct work to the areas or rooms to be conditioned.

The flow control device 42 is effective to reduce the operational costs of the unit 10 by permitting a portion or all of the supply air to bypass the high capacity filtration system 40 which would otherwise cause a significant pressure drop in the system. When bypass of the filtration system is desired, the flow control lower section 46 is closed and the upper section 44 is opened. Likewise, when filtration of the mixed air is desired, the lower section 46 is opened and the upper section 44 is closed. The upper and lower sections may also be placed in intermediate positions which permit partial flow through both the bypass passage 48 and filtration system 40. Bypassing the filter when filtration is not required extends the filter life and reduces costs associated with the material and labor of filter replacement.

Automatic positioning of the flow control device 42 in response to air quality conditions is directed by the controller based on the air quality detectors 74, 76 and 78. The detectors 74, 76 and 78 are also operably coupled via the controller 29 with the outside and return air inlet dampers 30 and 32 to establish the most energy efficient operating configuration under the current air quality and other operating conditions. For example, under a minimal thermal load with no heating, cooling or filtration of the outside air required, the outside air damper 30 and flow control upper section 44 may be opened and the return air damper 32 and flow control lower section 46 closed. Provided the outdoor air is of satisfactory quality, acceptable air quality levels are thereby maintained in the building without the pressure drop and increased operating costs created by high capacity filtration systems. As another example, when minimum outside air is desired, the return air damper is opened and the outside air damper is moved to a minimum open position. The flow control device 42 is then positioned to either route the return air through the filtration system 40 or through the bypass passage 48, as dictated by the filtration requirements.

Figure 3A:
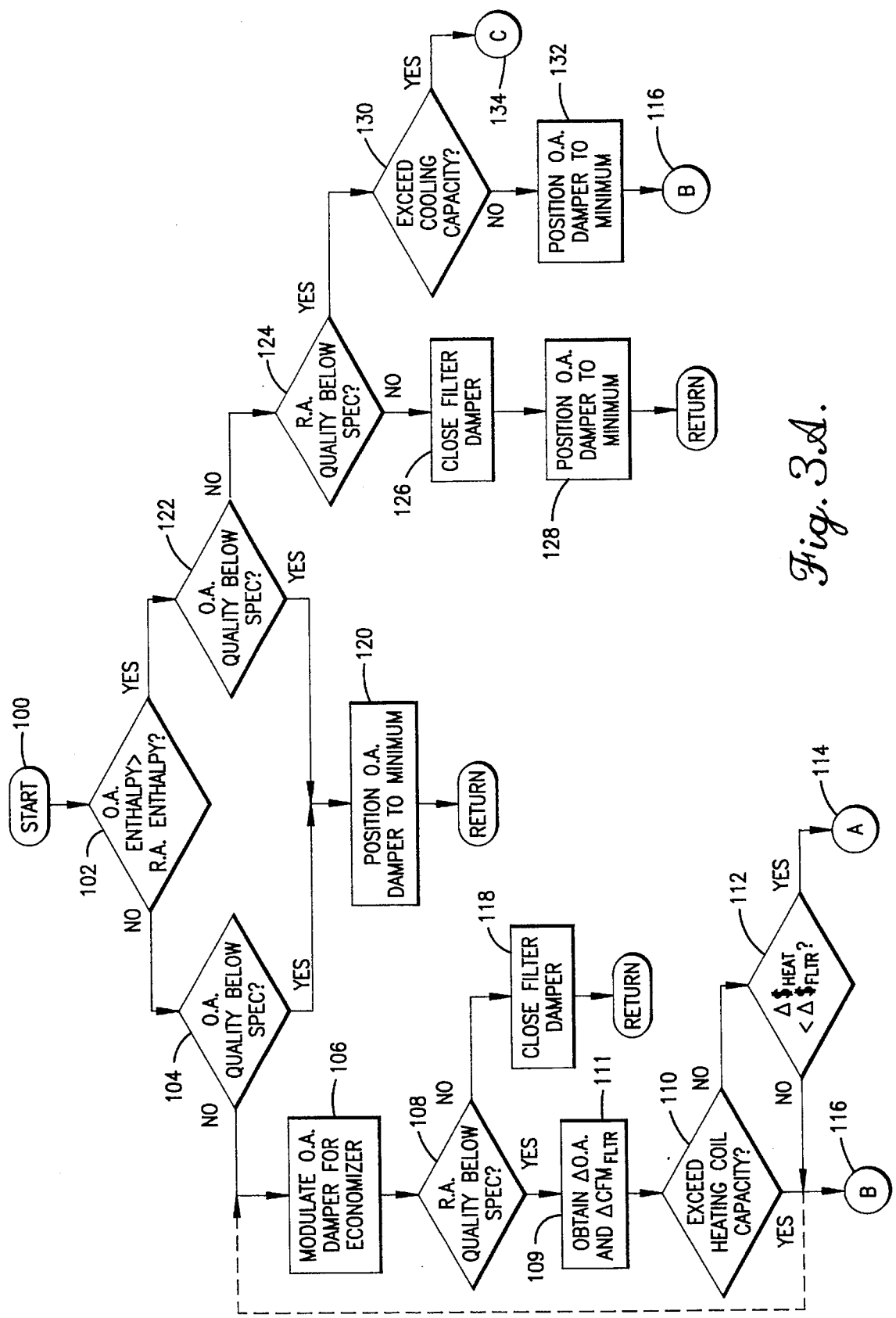
FIG. 3A illustrates a processing sequence undergone by the present invention to control the conditioning unit illustrated in FIG. 1.
Figure 3B:
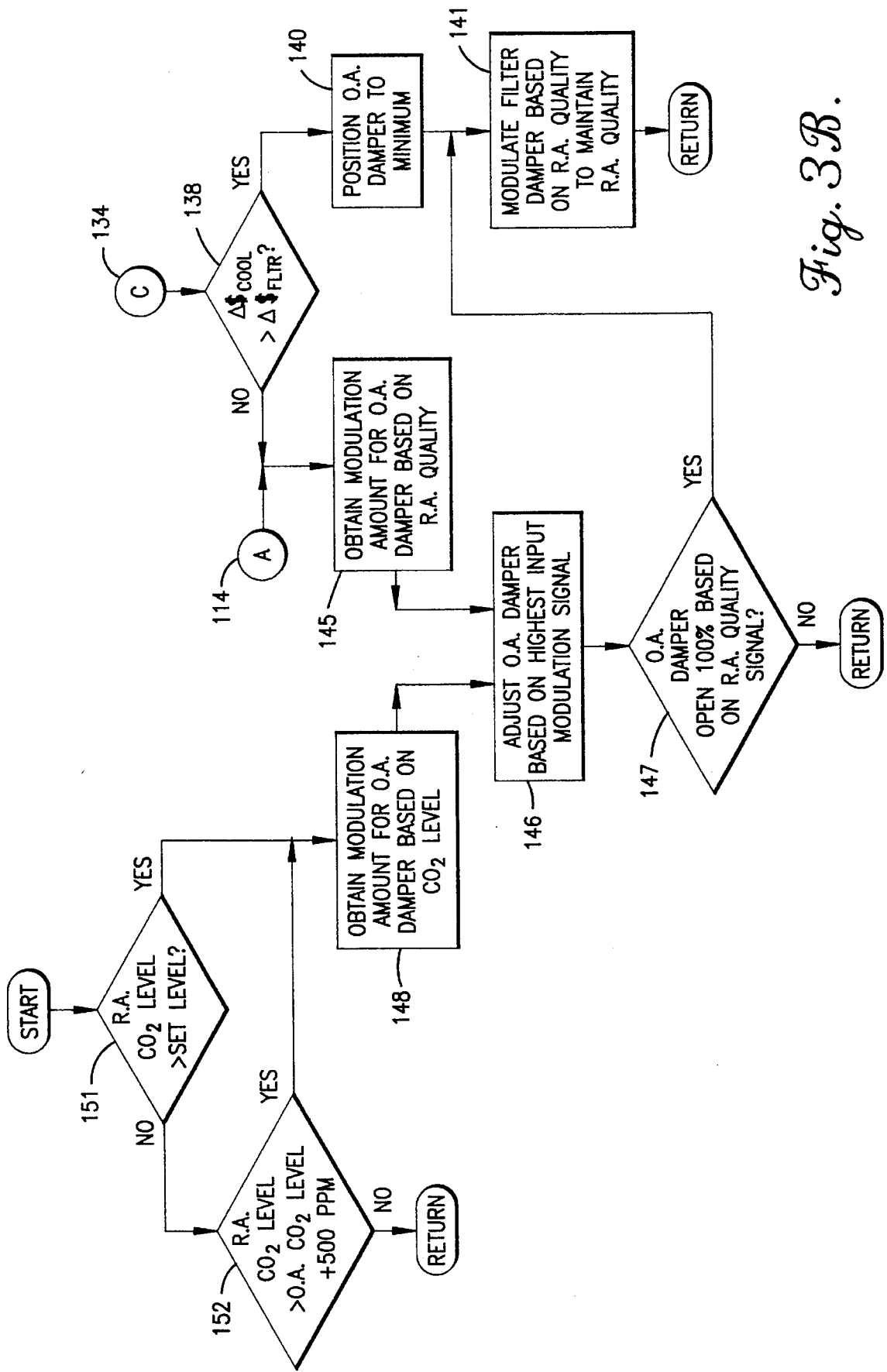
FIG. 3B illustrates a processing sequence undergone by the present system during control of the apparatus illustrated in FIG. 1.

FIGS. 3A and 3B illustrate the processing sequence undergone by controller 29 to adjust the dampers 30 and 32 and the flow control device 42. Beginning with FIG. 3A, when the controller 29 starts 100, it tests the enthalpy, quality and air flow rates of the outside, return, mixed and supply air. The controller 29 next compares the enthalpy readings for the outside and return air to determine whether the outside air enthalpy is greater than the return air enthalpy (step 102). If this decision is answered in the negative, the controller 29 next utilizes the reading obtained within sensor 78 for the quality of the outside air and determines whether this quality falls below a minimum acceptable standard (step 104). If the quality of the outside air is such that it contains more contaminants than are acceptable, flow passes to step 120 at which the controller 29 positions the outside air damper 30 to a minimum setting. In this manner, the controller 29 sets the damper 30 to admit the minimum allowed amount of outside air (e.g., 100 cfm). Each time the controller 29 reaches a RETURN block it waits a preset period of time and repeats the processing sequence of FIGS. 3A and 3B.

Returning to step 104, when the outside air quality is identified to be above the minimum acceptable level, flow passes to step 106 at which the controller 29 modulates the outside air damper 30 to effect an "economizer cycle." The "economizer cycle" is described in the "ASHRAE Handbook 1991", Chapter 41, which is incorporated by reference. In general, during an economizer cycle, the outside air damper 30 is adjusted to admit an amount of outside air sufficient to maintain the mixed air temperature at a desired level. When processing flow reaches step 106, the outdoor air enthalpy must be less than the return air enthalpy. Thus, as the percentage of outside air increases forming the mixed air (within the intake chamber 34), the enthalpy of the mixed air decreases.

The economizer cycle is based on mixed air temperature and, during operation, always opens the outside air damper as much as required to maintain the mixed air (or supply air) temperature at the desired setpoint (e.g., 50° F.). If the temperature of the mixed air deviates below this set point, in the economizer cycle, the outdoor air damper is moved toward the closed position (to admit less cool outside air), and the return air damper is opened gradually to admit more warm return air) until the mixed air temperature reaches the set point. Similarly, as the temperature of the mixed air goes above the set point, in the economizer cycle, the outdoor air damper is gradually modulated open.

Generally, the heating coil is only required due to an adjustment made during the economizer cycle, when the outside air temperature is very low and the minimum flow rate of outside air is relatively high. The economizer cycle is always required to use the minimum outside air flow rate, and thus in this situation the mixed air temperature would fall below the setpoint (e.g., if O.A. temp.=−20° F. and minimum O.A. flow is 40% of total air flow and R.A. temp.=80° F., then the mixed air temp. would equal 0.4(−20)+0.6(80)=40°). In this example, the heating coil would be required to raise the mixed air temperature to 50° F (the setpoint).

The "economizer cycle" of step 106 is carried out consistent with any one of several known damper control techniques such as with fuzzy logic or a PID algorithm, such as one disclosed in the "ASHRAE 1991 Applications Handbook", Chapter 41, and the "Economizer Control Description ASHRAE 1991 Applications Handbook" Chapter 41, both of which are expressly incorporated herein by reference. The modulation function varies the outside air damper setting based on the supply air enthalpy set point and the error from set point as sensed by a temperature sensor approximately located.

Next, control passes to step 108 at which the controller 29 determines whether the quality of the return air falls below the specification limit. If the quality of the return air is acceptable, the return air need not be filtered by the high capacity filtration system 40. Thus, control passes to step 118, at which the controller 29 directs the control device 42 to close the lower or face damper section 46 and to open the upper or bypass damper section 44. Returning to step 108, if the return air is unacceptable, such air must be filtered, if reused, by the high capacity filtration system 40.

However, the outside air quality has been identified as being above the acceptable standard (step 104) and need not be filtered. Thus, it may be preferable to utilize clean cool outside air, rather than filtered return air to improve the mixed air quality. Along this line, in step 109, the controller obtains a new damper position for the outside air damper which represents a "preferred" or percentage change (%ΔOA) in the amount of air admitted through the damper 30 (e.g., 10% more outside air when the return air is slightly dirty, 20% more outside air when the return air is very dirty and the like). The "preferred change may also be represented as a change in cubic feet per minute of outside air flow $\Delta cfm_{OA}$ by multiplying the percentage change $\%\Delta OA$ by the current air flow volume of outside air $cfm_{COA}$. The damper position obtained in step 109 represents a damper change above and beyond any adjustment effected in the economizer cycle within step 106. The damper position obtained in step 109 further represents a "preferred" setting since the controller 29 does not automatically adjust the damper 30 to this setting.

Prior to rendering the preferred setting adjustment, the controller 29 must first determine whether the conditioning unit is capable of processing (i.e., heating) the amount of outside air that will be admitted through the damper 30 if it is adjusted by the percentage change ($\%\Delta OA$) equal to the "preferred" setting. Some amount of heating will be required since the economizer cycle in step 106 has already admitted the maximum amount of outside air that is acceptable while maintaining the mixed air temperature at the setpoint without using the heating coil. The controller also obtains new readings from the sensors, at least for outside, return and mixed air enthalpy and air flow to account for any adjustments effected in step 106.

After step 109, control passes to step 110, at which the controller determines whether the heating coil is capable of utilizing the amount of additional outside air that will be introduced if the damper 30 is adjusted by the percentage change ($\%\Delta OA$). The controller uses the following equation to calculate the total amount of outside air that will be used if moved to the "preferred" setting: $cfm_{POA}=(1+\%\Delta OA)(cfm_{COA})$; wherein ($\%\Delta OA$) represents the percentage change in outside air obtained in step 109, and $cfm_{COA}$ represents the total current outside air flow admitted through the outside air damper 30.

The current outside air flow $cfm_{COA}$ may be sensed directly by the air flow sensor 55 or 78. Alternatively, the total current outside air flow $cfm_{COA}$ may be obtained by comparing the pressure drop across the outside air damper 30 and the position of the outside air damper blades with a calibration curve for that damper. As a further alternative, the outside air flow $cfm_{COA}$ may be calculated based upon the temperature of the outside and return air ($t_{OA}$ and $t_{RA}$) and the total current mixed air flow $cfm_{COA}$, provided that the outside air temperature is somewhat different from the return air temperature. For example, using this final method, the outside air flow $cfm_{COA}$ may be calculated based on the equation: $(cfm_{COA})(t_{OA})+(cfm_{MA}-cfm_{COA})(t_{RA})=(cfm_{MA})(t_{MA})$; where $t_{MA}$ represents the measured temperature of the mixed air within intake chamber 34 and the remaining variables represent the air flow rates and temperature as explained above. The variables $t_{OA}$, $t_{RA}$, $cfm_{MA}$, and $t_{MA}$ may be obtained from the appropriate sensors.

For instance, if it is assumed that the outside and return air temperatures are 40° F. and 80° F., respectively, the set point temperature for the mixed air is 50° F., and the mixed air flow rate is 8000 cfm, then the maximum outside air flow rate $cfm_{MOA}$ equals 6000 cfm or 75% of the total mixed air. In other words, the mixed air may include 6000 cfm or 75% outside air without turning ON the heating coil to maintain the mixed air temperature at 50° F. If the amount of outside air increases above 75%, then the heating coil must be activated to maintain the supply air temperature at the set point.

If it is assumed that the damper 30 is currently set at 75% open within the economizer cycle (i.e., $cfm_{COA}$=6000 cfm when the mixed air flow equals 8000 cfm) and that the preferred percentage change $\%\Delta OA$ equals 20%, then the damper 30 will be preferably adjusted to admit 7200 cfm of outside air (i.e., $cfm_{POA=(}1+\%\Delta OA)$ ($cfm_{COA}$).

The preferred outside air flow rate $cfm_{POA}$, and the outside and return air temperatures $t_{OA}$ and $t_{RA}$ are used to calculate the resulting mixed air temperature $t_{MA-RES}$ that will result when the preferred outside air flow rate $cfm_{POA}$ is used ( i.e., $t_{MA-RES=[(tOA)}$ $(cfm_{POA})]/[cfm_{MA]+(tRA)}$ $(cfm_{MA}-cfm_{POA})]/[cfm_{MA}]$. In the foregoing example, $t_{MA-RES}=44°$ F.$=[(40)$ $(7200)]/[8000]+80[8000-7200)]/8000$. Once the resulting mixed air temperature is calculated, the heat energy may be calculated in BTUs/HR that will be used to maintain the supply air at the desired temperature $t_{SA}$ based on the equation:

BTU/HR=$cfm_{MA}$ (K)($t_{MA-SET}-t_{MA-RES}$); where K represents a constant (generally 1.085 for standard air density i.e., sea level at 70° F.). If the altitude or temperature are not at standard values, the constant must be corrected accordingly. $cfm_{MA}$ represents the total air flow, $t_{MA-RES}$ represents the resulting mixed air temperature calculated above and $t_{MA-SET}$ represents the mixed or supply air desired setpoint temperature. If $cfm_{MA}$ equals 8000 cfm, the supply air temperature equals 50 and the resulting mix air temperature equals 44, the foregoing equation may be solved as follows:

8000(1.085)(50–44)=52080 BTU per hour.

The heating coil capacity (as specified and installed for the HVAC system requirements) is sufficient to heat the 1200 cfm of additional outside air. Thus, the capacity of the heating coil is not exceeded within step 110 and flow passes to step 111. Alternatively, if the heating capacity of the coil was exceeded by the additional increment of outside air, control would pass to point 116 wherein flow moves to FIG. 3B.

Also in step 109, the controller obtains a preferable filter change $\Delta cfm_{FLTR}$ (and percentage filter change $\%\Delta cfm_{FLTR}$) to adjust the face damper 46 to allow additional return air through the high capacity filtration system 40. This preferred filter change $\Delta cfm_{FLTR}$ may be a preset increment, such as 20% or 0.2($cfm_{FLTR}$) wherein the face damper 46 will preferably be opened to admit an additional 20% more air through the filter 40. Again the filter damper change $\Delta cfm_{FLTR}$ is a "preferred" setting since it is not yet implemented. First, the controller must determine whether it is more feasible to open the damper 46 by this additional amount $\Delta cfm_{FLTR}$, or alternatively to open the outside air damper 30 to admit additional outside air $\Delta cfm_{OA}$.

Optionally, the filter damper change $\Delta cfm_{FLTR}$ may be obtained from a proportionality table that establishes a proportional relationship between the filter damper change $\Delta cfm_{FLTR}$ and the outside air damper change $\Delta cfm_{OA}$. By way of example, if the outside air damper change $\Delta cfm_{OA}$ is calculated to equal 10%, the table would contain an equivalent increase in the filter damper change $\Delta cfm_{FLTR}$ to filter an equivalent incremental increase in return or mixed air (e.g. 5%, 20% and the like depending upon the quality of the return air).

Next, control passes to step 112, at which the controller 29 is now presented with two manners to achieve the desired supply air quality and temperature, namely (1) through maximizing the use of outside air or (2) through maximizing the use of return air. Maximizing the use of outside air requires the system to incur additional costs associated with heating this air, while maximizing the use of return air requires the system to incur costs associated with filtering the return air. Thus, the controller 29 must determine (at step 112) the most economical way of achieving the desired supply air quality and temperature. At step 112, the controller compares the additional heating costs with the additional filtering costs. If the former option is more feasible, control passes to point 116. If the latter option is more feasible, control passes to point 114.

In step 112, the foregoing decision is determined based upon the following equation:

$$\Delta\$_{HEAT} < \Delta\$_{FLTR};$$

where $\Delta\$_{HEAT}$ represents the cost of the energy required to heat the mixed air from its resulting air temperature $t_{MA\text{-}RES}$ to the setpoint $t_{SA\text{-}SET}$ once the preferred change in outside air $\%\Delta OA$ is added and $\Delta\$_{FLTR}$ represents the cost of the energy required to filter an equivalent amount of return air $\Delta cfm_{FLTR}$. The cost of the heat energy is obtained based on the following equation:

$$\Delta\$_{HEAT} = (cfm_{MA})(K)(t_{MA\text{-}SET} - t_{MA\text{-}RES})(\$/BTU);$$

wherein $\$/BTU$ represents the cost per BTU of energy and the variables $cfm_{MA}$, K, $t_{MA\text{-}SET}$ and $t_{MA\text{-}RES}$ are explained above. The cost per BTU of energy may be varied depending upon the time of day to account for peak-time and non-peak-time prices charged by the power company.

The increase in the cost of the filter energy $\Delta\$_{FLTR}$, which would be required if the filter damper 46 were opened by the amount $\Delta cfm_{FLTR}$ to filter additional mixed or return air, equals the sum of the fan energy cost $\Delta\$_{FAN}$ and the filter replacement/use cost $\Delta\$_{REPLACEMENT}$ (i.e., $\Delta\$_{FLTR} = \Delta\$_{FAN} + \Delta\$_{REPLACEMENT}$). The total filtering cost includes the cost of the increased fan energy and the incremental filter material and replacement costs. The filter replacement cost $\Delta\$_{REPLACEMENT}$ may be obtained from the manufacturer and may be based on a cost per cfm/HR passed through the filter (i.e., $\Delta\$_{REPLACEMENT} = $(replacement cost per $cfm)(cfm_{MA})$; where $cfm_{MA}$ represents the air flow through the filter after the face damper is opened $\%\Delta cfm_{FLTR}$).

The additional cost for fan energy $\Delta\$_{FAN}$ results from the increase in static pressure drop within the conditioning system. The change in static pressure drop equals a change in static pressure drop across the high efficiency and/or gas phase filters $\Delta_{DPFL}$ caused by the increased air flow which will result when the face damper is opened $\%\Delta cfm_{FLTR}$. The cost of the increase in fan energy ($\Delta\$_{FAN}$) maybe calculated based on the equation:

$$\Delta\$_{FAN} = [E_{CFAN}(DP_{FN2}/DP_{FN1})] - E_{CFAN};$$

wherein $E_{CFAN}$ represents the energy currently being consumed by the fan, $DP_{FN1}$ represents the current static pressure drop across the fan (before the face damper is moved) and $DP_{FN2}$ represents the future static pressure drop across the fan (after the face damper is moved). The future static pressure drop $DP_{FN2}$ maybe calculated as follows:

$$DP_{FN2} = DP_{FN1} + DP_{FL2} - DP_{FL1};$$

wherein $DP_{FL1}$ and $DP_{FL2}$ represent the current static pressure drop across the high capacity filtering system 40 (before the face damper is moved) and the future static pressure drop across the filtering system 40 (after the face damper is moved). The $DP_{FL2} - DP_{FL1}$ represents a differential increase in filter drop. The future static pressure drop across the filter $DP_{FL2}$ maybe calculated according to the following equation:

$$DP_{FL2} = DP_{FL1}(1 + \%\Delta FLTR_{CHANGE})^2;$$

wherein $\%\Delta FLTR_{CHANGE}$ represents a percentage change in the air flow through the filtering system 40 when the face damper 46 is moved by the preferred amount $\%\Delta cfm_{FLTR}$. The percentage change $\%\Delta FLTR_{CHANGE}$ is obtained in step 111 and represents the ratio $(\%\Delta cfm_{FLTR})/(\%cfm_{CURRENT})$; wherein $\%cfm_{FLTR}$ represents the preferred percentage change in air flow through the filter damper 46 and $\%cfm_{CURRENT}$ represents the percentage of outside air passing through the filter before the damper 46 is adjusted to admit the additional amount $\%\Delta cfm_{FLTR}$.

During an initial pass through step 111, in which the face damper 46 is completely closed, the controller 29 determines that the face damper 46 will be opened by a preset amount (e.g., 20%) which corresponds to a preset pressure drop (e.g., 0.08 inches). Thus, on the first pass through step 111 when the face damper 46 is closed (but will be preferably opened 20%), the current static pressure drop $DP_{FL1} = 0$ and the future static pressure drop $DP_{FL2}$ is automatically set to equal 0.8 inches. In this case, the differential pressure drop $DP_{FL2} - DP_{FL1} = 0.08$ inches. On the second pass through step 111, when the face damper 46 is already open 20% (and will preferably opened an additional 20%), the current static pressure drop $DP_{FL1} = 0.08$ inches and the future static pressure drop $DP_{FL2} = 0.32$ inches (i.e., $DP_{FL2} = DP_{FL1}(1 + (\%\Delta cfm_{FLTR})/(\%cfm_{CURRENT}))^2$ or $DP_{FL2} = 0.08\{1 + (0.2/0.2)\}^2$). The differential pressure drop $DP_{FL2} - DP_{FL1} = 0.24$ (i.e., 0.32–0.08).

On the third pass through step 111, when the face damper 46 is already open 40% (and will preferably opened an additional 20%), the current static pressure drop $DP_{FL1} = 0.32$ inches and the future static pressure drop $DP_{FL2} = 0.72$ inches (i.e., $DP_{FL2} = DP_{FL1}(1 + (\%\Delta cfm_{FLTR})/(\%cfm_{CURRENT}))^2$ or $DP_{FL2} = 0.32\{1 + (0.2/0.4)\}^2$). The differential pressure drop $DP_{FL2} - DP_{FL1} = 0.40$ (i.e., 0.72–0.32).

On the fourth pass through step 111, when the face damper 46 is already open 60% (and will preferably opened an additional 20%), the current static pressure drop $DP_{FL1} = 0.72$ inches and the future static pressure drop $DP_{FL2} = 1.28$ inches (i.e., $DP_{FL2} = DP_{FL1}(1 + (\%\Delta cfm_{FLTR})/(\%cfm_{CURRENT}))^2$ or $DP_{FL2} = 0.72\{1 + (0.2/0.6)\}^2$). The differential pressure drop $DP_{FL2} - DP_{FL1} = 0.559$ (i.e., 1.28–0.72).

On the fifth pass through step 111, when the face damper 46 is already open 80% (and will preferably opened an additional 20%), the current static pressure drop $DP_{FL1} = 1.24$ inches and the future static pressure drop $DP_{FL2} = 2.0$ inches (i.e., $DP_{FL2} = DP_{FL1}(1 + (\%\Delta cfm_{FLTR})/(\%cfm_{CURRENT}))_2$ or $DP_{FL2} = 1.24\{1 + (0.2/0.8)\}^2$). The differential pressure drop $DP_{FL2} - DP_{FL1} = 0.76$ (i.e., 2.0–1.24).

In addition, the fan energy equation may account for motor and fan efficiencies. The cost per kilowatt of fan energy may also be varied with different times of day to account for variations in the charges of power companies as peak times of the day. The filter costs may account for the cost of the filter, replacement costs, and the like. The energy drawn by the fan $\$_{FAN}$ may be obtained by monitoring the power consumption of the fan (i.e., by an amp meter or a watt meter) or by monitoring the output of the motor speed controller which dictates the rotational speed of the fan and may have logic to output a signal proportional to total power draw. The static pressure drop $DP_{FN1}$ across the fan may be measured, such as by a transducer and the like. Optionally, the percent increase in static pressure drop across the filter ($\Delta DP_{FN}$) occurring when additional air is passed through the high efficiency filter may be obtained by directly measuring the static pressure drop across the filter or by utilizing a look up table which is adjusted to account for "loading" of the filter occurring over time (i.e., an increase in static pressure drop for a given air flow rate due to clogging of the filter).

As illustrated in FIG. 3B, if the heating energy cost $\Delta\$_{HEAT}$ is less than the filtering energy cost $\Delta\$_{FLTR}$ the controller obtains a modulation amount for the outside air damper ($\Delta cfm_{OA}$) based on the return air quality (step 145). Next, the controller adjusts the outside air damper 30 (step 146) by opening it an amount equal to the outside air damper change $\Delta cfm_{OA}$. If the heating energy cost $\Delta\$_{HEAT}$ is greater than the filtering cost $\Delta\$_{FLTR}$ the controller allows the outside air damper 30 to modulate on the normal economizer cycle (step 106). Next, the controller obtains a modulation amount for the face damper ($\Delta cfm_{FLTR}$) based on the return air quality and moves the face damper accordingly (step 141).

Returning to FIG. 3A, at step 102, when the enthalpy of the outside air is determined to be greater than the enthalpy of the return air, control passes to step 122. At step 122, the controller tests the outside air quality to determine whether it meets the minimum acceptable standard. If this standard is not met, control passes to step 120 at which the outside air damper 30 is set to admit a minimum acceptable amount of outside air. At step 122, if the outside air quality is above the acceptable standard, control passes to step 124 at which the controller 29 determines whether the return air quality is below the minimum standard. If not, the flow control device 40 is adjusted to close the face damper 46 and open the upper section damper 42 in order to bypass the high capacity filtration system 40. Thereafter, the outside air damper is set to admit the minimum amount of outside air (step 128).

At step 124, if the quality of the return air is below the minimum acceptable level, control passes to step 130 at which the controller determines whether the cooling coil capacity is capable of reducing the enthalpy of the mixed air to a desired enthalpy set point (e.g., 50° F. at 98% humidity) when the amount of outside air is increased by the percentage change $\%\Delta cfm_{OA}$. The cooling requirement is calculated based on equations similar to that used above to calculate the resulting mixed air temperature and the heating requirement, except that the temperature variables $t_{MA-SET}$ and $t_{MA-RES}$ for the mixed air setpoint and the resulting mixed air temperature are replaced with enthalpy variables for the mixed air enthalpy set point $h_{MA-SET}$ and the resulting mixed air enthalpy $h_{MA-RES}$. The resulting mixed air enthalpy $h_{MA-RES}$ is calculated based on the outside and return air enthaply measurements and based upon the percentage of outside and return air being added to the mixed air. This calculation may be effected in a variety of known manners once the enthalpy and air flow measurements are taken for the outside and return air.

Once the resulting mixed air temperature is calculated, the cooling energy may be calculated in BTUs/HR that will be used to maintain the mixed air at the desired enthalpy setpoint $h_{MA-SET}$ based on the equation:

$$BTU/HR = cfm_{MA} (K) (h_{MA-SET} - h_{MA-RES});$$

where K represents a constant (generally 4.5 at standard air density) to convert to BTUs per HR, $cfm_{MA}$ represents the total air flow, $h_{MA-RES}$ represents the resulting mixed air enthalpy calculated above and $h_{MA-SET}$ represents the mixed or supply air desired setpoint enthalpy. If the altitude or temperature are not at standard values, the constant must be corrected accordingly. The preferred amount of outside air $cfmp0_A$ is obtained, prior to step 130, along with the maximum uncooled cfm of outside air $cfm_{MOA}$ that may be introduced without using the cooling coil to maintain the mixed air enthalpy.

By way of example, if the outside air is at 95° F. and 40% humidity and the return air is at 78° F. and 45% humidity, the mixed air will be 82° F. at 45% humidity. If the supply air is preferably maintained at 55° F. and 98% humidity, the cooling coil will be required to reduce the enthalpy of the mixed air by $\Delta h$. Once this enthalpy change $\Delta h$ is calculated, it is converted to BTUs/hr and compared to the design cooling coil capacity. If the capacity of the cooling coil is not exceeded, control passes to point 134 in FIG. 3B. Otherwise, control passes to step 132 at which the outside air damper is positioned to admit the minimum acceptable amount of outside air. Thereafter, control passes to point 116 in FIG. 3B.

It should be noted from the above calculations that, for a given incremental flow change through the filter, that the differential pressure (and thus the fan energy) does not change at the same rate. For example, during the second pass (or second incremental flow change) the pressure drop equals 0.24 inches. In addition, for the same incremental change in cfm through the filter, the pressure drop changes by 0.76 inches. Thus, for a given outside air enthalpy level, it may be more cost effective to filter an increment of return air. However, as more air is passed through the filter, it may reach a balance point where it would be more economical to use outside air for the next increment of "effective dilution".

The controller reviews this calculation for each process cycle and, if the outside air enthalpy changes, or the effective dilution rate for outside air changes (such as when the outside air becomes more contaminated) the controller recalculates the economics of filtration versus dilution and positions the damper to obtain the desired ratio of outside air and filtered air.

Returning to FIG. 3B, when flow passes to point 134, the controller 29 determines in step 138 the most cost efficient method of reducing contaminant concentration within the supply air. In particular, the controller 29 determines whether the energy cost required to cool the outside air $\Delta\$_{COOL}$ exceeds the cost required to filter return air $\Delta\$_{FLTR}$.

The cooling energy is calculated by the following equation:

$$\Delta\$_{COOL} = (cfm_{MA})(\Delta h)(K) \text{ (cost/BTU of cooling)};$$

where $\Delta h$ represents the enthalpy differential between the resulting mixed air enthalpy (after introducing the preferred increase in outside air) and the setpoint mixed air enthalpy, $cfm_{MA}$ represents the mixed air flow rate of the outside air to be cooled and K represents a constant (4.5) to account for standard air density. The filter cost (which equals energy plus replacement) is calculated as explained above in connection with step 112.

If the cooling cost $\Delta\$_{COOL}$ exceeds the filtering cost, control passes to step 140 at which the controller 29 directs the outside air damper 30 to be set to its minimum acceptable level. Thereafter, the controller 29 modulates the flow control device 40 as explained above (at step 141) and processing flow returns to the starting point 100. If the cooling cost does not exceed the filter cost, flow passes to step 145 at which the controller obtains the modulation amount to move the outside air damper dependent upon the return air quality. Thereafter, the outside air damper is moved based upon this modulation amount (step 146). Next, the controller determines whether the outside air damper has been opened 100% in response to a modulation amount obtained in step 145 based upon the return air quality (step 147). If not, the system returns to the starting point. If the outside air damper has been opened 100% in response to a poor return air quality signal, flow passes to step 144 at which the controller determines whether to adjust the face damper upon the filter to further filter the mixed air. Flow only passes from step 147 to step 141 when the return air quality is extremely poor and the outside air damper has been opened 100%.

The controller 29 undergoes a second processing sequence (beginning at step 150) wherein it compares the $CO_2$ level within the return air to a set limit (e.g., 1000 PPM) (step 151). If that level is exceeded, flow passes to step 148. If the limit is not exceeded, it compares the return air $CO_2$ level with the $CO_2$ level within the outside air (step 152). If the return air $CO_2$ level exceeds the outside air $CO_2$ level by a preset value (e.g., 500 PPM) (step 152) flow passes to step 148 at which the outside air damper 30 is modulated based on the detected $CO_2$ level in the return air. If the $CO_2$ level within the return air does not exceed that of the outside air by this preset value, flow passes to the RETURN block. The controller 29 performs the $CO_2$ evaluation (step 152) in parallel, or in series with the remaining process illustrated in FIGS. 3A and 3B.

Figure 2:
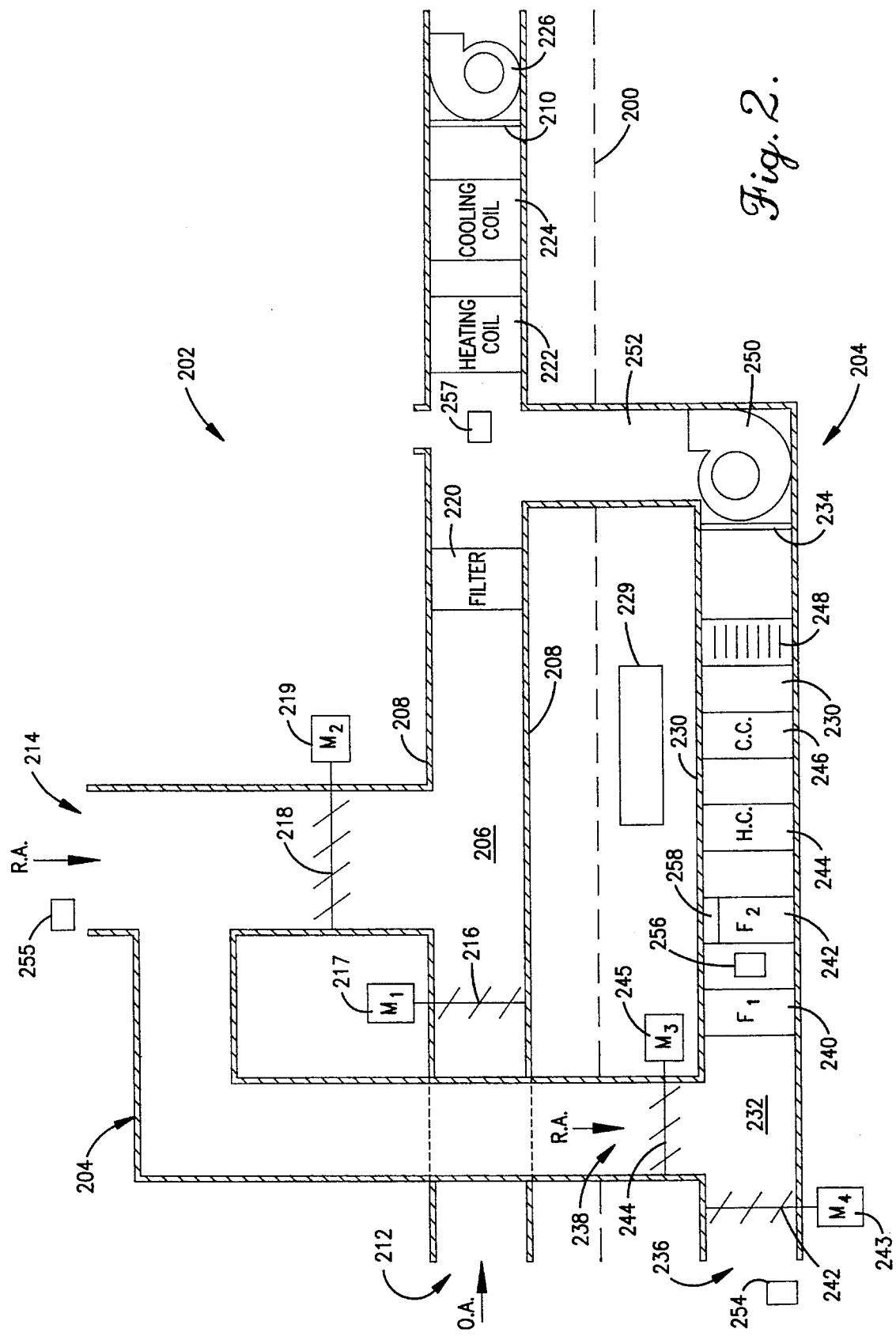
FIG. 2 illustrates a block diagram of an alternative embodiment wherein a high capacity filtration system, sensors and controller according to the present invention have been retrofitted to a conventional air conditioning unit.

FIG. 2 illustrates an alternative embodiment for a control system which may be added to an existing conditioning system. The system of FIG. 2 illustrates a basic air conditioning system above the dashed line 200 (generally designated by the reference numeral 202). The system below the dash line 200 (generally designated by the reference numeral 204) is referred to as a pony pack 204. The conditioning unit 202 includes an intake chamber 206 defined by top, bottom and side walls 208, an intermediate end partition 210, an outside air inlet port 212 and a return air inlet port 214. The inlet ports 212 and 214 are separately and controllably closed via dampers 216 and 218, respectively. The dampers 216 and 218 are controlled via motors 217 and 219, which are in turn controlled via the controller 229.

The intake chamber 206 includes a filter 220 interposed thereacross which represents a normal filter to remove medium and large size particulate material from the supply air. The downstream side of the filter 220 passes the supply air to heating and cooling coils 222 and 224. Air discharged from the heating and cooling coils 222 and 224 passes to the discharge fan 226 which directs the discharge air through the duct work within the building.

The pony pack 204 is added to an existing air conditioning unit to increase the air filtration capacity and/or to maintain the minimum ventilation rate at a desired level and to provide additional cooling or heating capacity. This additional cooling/heating capacity may be needed to handle an increased ventilation air flow volume, such as to achieve dilution of contaminates within the buildings space or to comply with federal, state and local codes. Depending upon the application, the pony pack can be operated continuously whenever the main air condition units supply fan 226 operates, or alternatively the pony pack can run in a cycled manner as required to maintain controlled minimum ventilation or increased filtration.

The pony pack 204 is located proximate the intake chamber 206 and is constructed with top, bottom and side walls 230. The pony pack 204 includes a intake chamber 232 defined by the top, bottom and side walls 230, an intermediate end partition 234, an outside air inlet port 236 and a return air inlet port 238. The return air inlet port 238 communicates with the return air inlet port 214 via duct work 240. The inlet ports 236 and 238 are controllably shut via dampers 242 and 244, respectively, which are controlled via motors 243 and 245. The motors 243 and 245 are controlled by the controller 229.

Within the intake chamber 232, a prefilter 240 is optionally provided thereacross to filter medium and larger size particulate material from the supply air within the intake chamber 232. Downstream of the prefilter 240 is provided a high efficiency filtration system 242 which may include a high efficiency particulate filter (e.g. a HEPA filter) and/or a gas phase filter (e.g. a carbon filter). The control of the pony pack dampers and fan is dependent upon the quality of the outside and return air. For instance, if the return air quality is identified as having high VOC levels, the controller 229 determines if it is more economical to introduce more air through the outside air damper 216 or to run the pony pack fan and introduce outside air through the dampers 236 and a portion of the return air through the damper 244 to provide additional filtering through the high efficiency filter 242. The controller monitors outside, return and filtered air quality for $CO_2$ levels, VOCs and other specified contaminates. In addition, the outside and return air enthalpy and pressure drop across the high efficiency filter is measured. The amount of total system air flow, total air flow through the pony pack and outside air flow through the pony pack is also measured. The outside air flow through the pony pack is measured with a conventional air flow station or by measuring the pressure drop across the damper when the damper is in a known position. Alternatively, the foregoing air flow measurements may be obtained through any other acceptable method of determining differential pressure measurements between two points within an air conditioning system.

Downstream of the high efficiency filtration system 242, a preheat coil 244 and cooling coil 246 are provided to adjust the temperature of the supply air as necessary. The high efficiency filtration system 242 may be constructed similar to the filtration system 40 in FIG. 1 to include a bypass about the end thereof. A damper system may be provided on the upstream side of the high efficiency or gas phase filter 242 to selectively bypass each filter depending upon quality of the supply air. Downstream of the cooling coil 246, an air flow station 248 is provided. Air passing from the air flow station 248 is delivered to the discharge fan 250 which directs the discharge air into a discharge portion 252 which communicates with the chamber 206 proximate the downstream side of filter 220. The air discharged from the fan 250 is combined with the supply air within the chamber 206 and ultimately delivered via the fan 226 to the duct work throughout the building.

The controller 229 monitors sensors 254–257 to identify the enthalpy, air flow rate, and air quality at the position of each sensor. A sensor 254 is located proximate the outside air inlet 236 for the pony pack 204. A second sensor 255 is located proximate the return air inlet 214. A third sensor 256 is located within the supply chamber 232. A fourth sensor 257 is located within the supply chamber 206. The sensors 254–257 may be formed of conventionally known sensor types to monitor enthalpy, air flow rates, and air quality. Optionally, separate sensors may be provided to monitor each desired characteristic. Optionally, an additional pressure sensor 258 may be located proximate the filtration system 242 in order to monitor the pressure differential between the intake and outlet sides of the filtration system 242. The pressure sensor 258 may be formed of a differential pressure transducer with pressure sensing tips on each side of the filtration system 242.

Figure 4A:
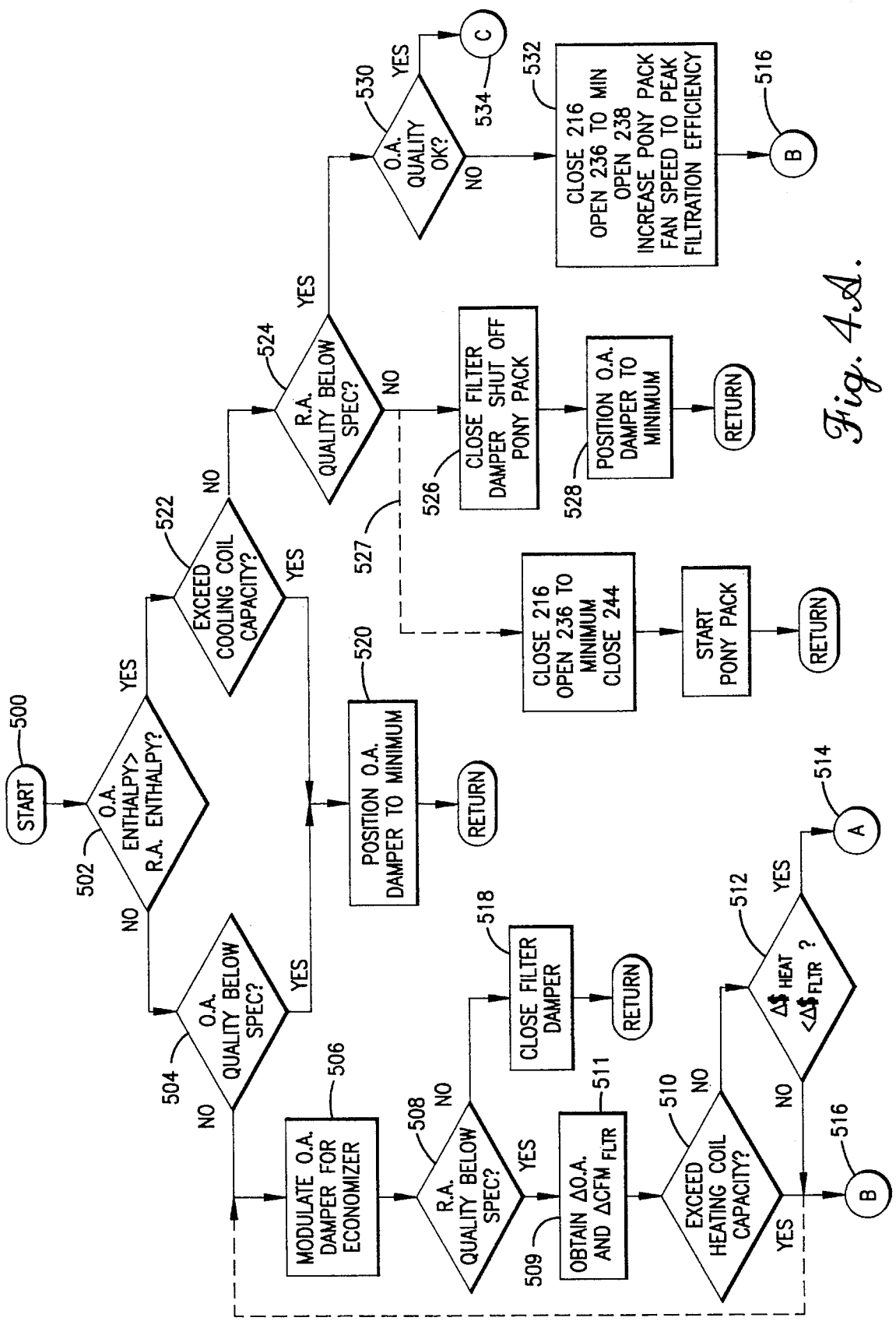
FIG. 4A illustrates a processing sequence undergone by a control system according to the present invention to control the apparatus of FIG. 2.
Figure 4B:
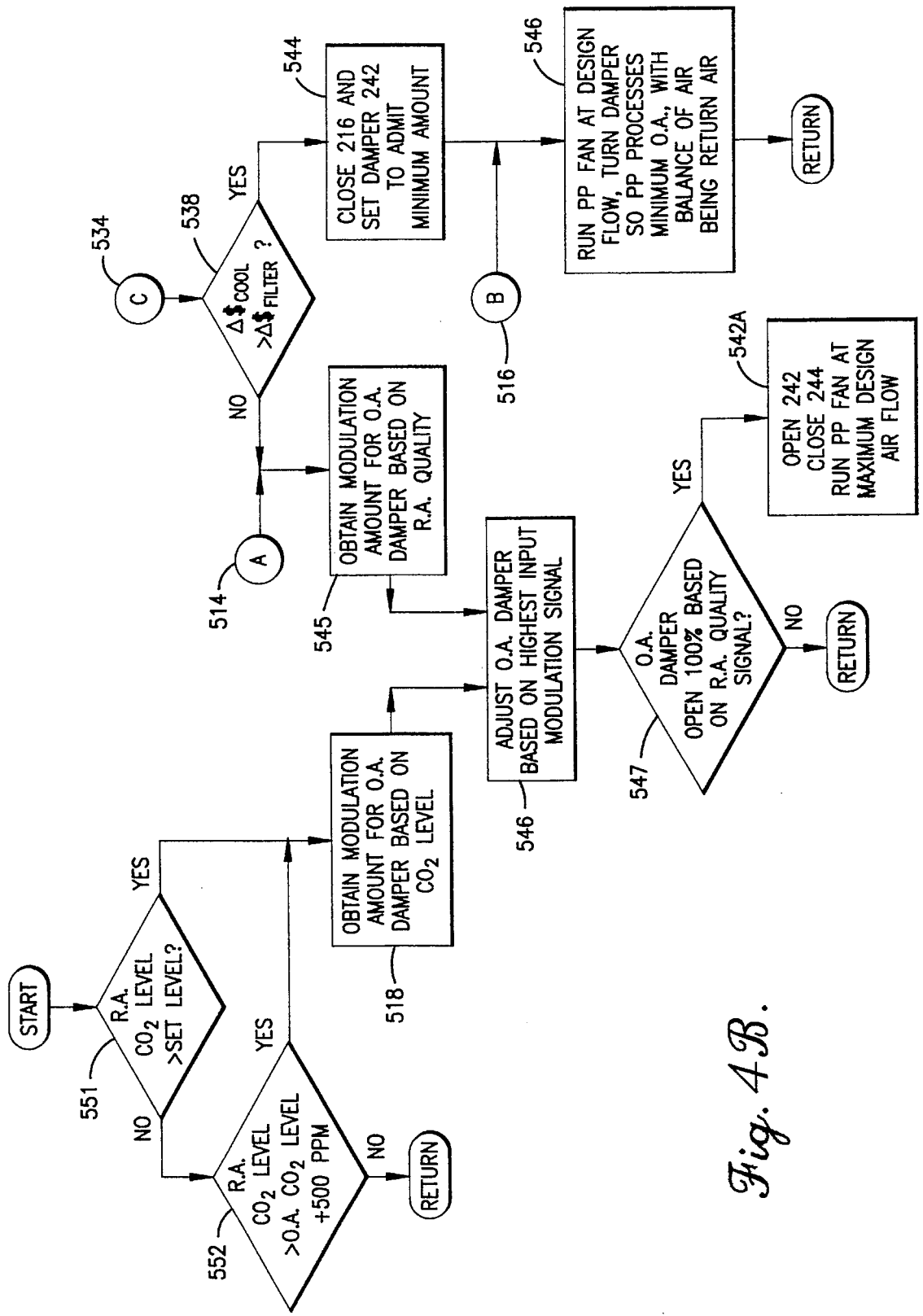
FIG. 4B illustrates a processing sequence undergone by a control system according to the present invention to control the apparatus of FIG. 2.

Turning to FIGS. 4A and 4B, the processing flow of the controller 229 is explained hereafter. Beginning with FIG. 4A, initially the controller 229 obtains air quality, flow rate and enthalpy measurements for the air in step 500. Next, it compares the outside air enthalpy with the return air enthalpy (step 502). If the enthalpy of the outside air is less than that of the return air, the controller 229 next compares the quality of the outside air with the minimum acceptable standard (step 504). If this quality falls below the minimum standard, the controller 229 determines that it is undesirable to utilize outside air and thus drives the motors 217, 243 and 245 to move the dampers 244 and 216 toward a closed position to admit a minimal amount of outside air (step 520). Air flow sensor 248 monitors this airflow and adjusts the speed (or volume control) damper on the fan 250 to assure sufficient air flow. At step 504, if the outside air quality is above the minimum acceptable standard, the controller determines that it is desirable to maximize the use of outside air and thus modulates (at step 506) the outside air dampers 216 and 242 and return air dampers 218 and 244 to maintain the supply temperature at a desired level. As explained above in connection with FIG. 3A, this modulation is controlled according to a conventional damper control routine, such as a fuzzy logic or PID algorithm.

The foregoing modulation is utilized to set the outside air dampers 216 and return air damper 218. Next, control passes to step 508 at which the return air quality is tested to determine whether it falls below the minimum standard. If not, the controller 229 determines that the supply air includes an air quality above the minimum standard and thus the controller 229 shuts off the discharge fan 250 within the pony pack (step 518) and closes dampers 242 and 244. At this point, the controller 229 has effectively removed the pony pack from the processing flow since the high efficiency filters 242 and 246 therein are not needed. By removing the pony pack 204 from the conditioning loop, the controller 229 improves the conditioning system's energy efficiency and lengthens the life of the high efficiency filter 240.

Returning to step 508, when the return air quality is determined to be billow the minimum acceptable standard, the controller 229 determines that it may be preferable to maximize the use of outside air (which has been identified in step 504 to have an air quality above the minimum standard) and to minimize the use of return air. As explained above, outside air can only be maximized to the extent that the heating and cooling coils can maintain the supply air's desired temperature. Thus, at step 509, it obtains a preferred change in outside air flow $\Delta cfm_{OA}$. Next, the controller 229 determines whether the heating coil 222 has a capacity capable of heating the air within the chamber 206 to the desired supply air temperature if an increased amount $\Delta cfm_{OA}$ of outside air is utilized (step 510). The heating capacity equals that of the heating coil 222 since the heating coil 222 will perform all heating of the mixed air within chamber 206. The heating differential $cfm_{HEAT}$ is based upon the same equation as utilized in FIG. 3A (step 110), in connection with the first embodiment. If the capacity of the heating coil 222 will be exceeded when maximizing usage of outside air, control passes to point 516 (within FIG. 4B). If the heating coil capacity is not exceeded, the controller 229 next determines whether it is more cost effective (at step 512) to maximize outside air usage or to utilize the pony pack to filter contaminants from the return air.

The controller 229 calculates the operating cost of the pony pack which would be required to filter the return air sufficiently to lower the contaminate level to fall within the acceptable standard. The operating cost of the pony pack is calculated by measuring the actual operating power consumption of the fan 250 $E_{CFAN}$ of the pony pack and calculating the increased power cost $\Delta\$_{PP}$ required to filter return air $cfm_{PP1}$ and for filter replacement cost. This calculation of the increased cost $\Delta\$_{PP}$ of the pony pack is based on the same equation as used above to calculate the power consumption and filter costs in step 112 (FIG. 3A) of the first embodiment, except that this calculation is based only upon the pony pack fan's power consumption cost $\$_{PP1}$ and pony pack filter's pressure drop $DP_{FL1}$. The energy consumed by the fan 226 is not included in this calculation since this element is used regardless of additional outside air is added or additional return air is filtered. Within step 512, $cfm_{PP1}$ represents the air flow through the pony pack at the time the calculation is made to test for energy comparison. $cfm_{PP2}$ represents $cfm_{PP1}+\Delta cfm_{FLTR}$; wherein $\Delta cfm_{FLTR}$ represents the incremental increase in return air flow through the pony pack. If the pony pack is turned OFF at the time of the calculation within step 512, the controller 229 utilizes fixed initial reference values for $cfm_{PP1}$ and $DP_{FL1}$ ($DP_{FL1}$ represents the static pressure drop across the high capacity filter).

Once the heating cost $\Delta\$_{HEAT}$ and pony pack costs $\Delta\$_{PP}$ are calculated, these values are compared in step 512 to determine which is more efficient. Based upon this comparison, the pony pack is utilized to filter return air or to utilize outside air introduced through damper 216 to dilute existing pollutants within passing the air through the filters of the pony pack.

Returning to step 502, if the enthalpy of the outside air is determined to be above that of the return air, control passes to step 522 at which it is determined whether the cooling coil 224 is capable of cooling the mixed air $cfm_{COOL}$ within chamber 206 to the desired enthalpy $\Delta h$ if more than the minimum outdoor is introduced. If the cooling coil's capacity is exceeded, the controller 229 positions the output air damper 216 to admit a minimum amount of outside air (step 520) or if the pony pack is to be used for minimum ventilation control, 216 is closed and 242 is opened to a minimum position and the pony pack is started. If the cooling coil capacity is not exceeded, the controller 229 next determines whether return air quality falls below the minimum acceptable level (step 524). If not, the controller positions the outside air damper 216 to admit a minimum amount of air (step 526). Thereafter, the controller 229 shuts off the pony pack 204 by closing the dampers 242 and 244 and by turning off the fan 250 (step 528). An alternative control scheme could be to close the damper 216 and open damper 236 to admit a controlled minimum amount of outside air. At step 524, if the return air quality is determined to fall below the specification standard, the controller 229 next determines whether the outside air quality is above the minimum acceptable standard (step 530). If the outside air quality is above this standard, control passes to point 534 within FIG. 4B. Otherwise, control passes to steps 532 and 533.

Optionally, at step 524, the controller may close the damper 216, open damper 236 to a minimum and close the damper 244. This ensures that the minimum of cfm of outside air is passed through the system since the pony pack dampers are more accurate to maintain minimum flow control (this alternative flow is illustrated in FIG. 4A via the dashed line 527).

Optionally, dampers 218 and 216 operated "together", but in opposite directions. Thus, when the damper 216 moves toward the open position, the damper 218 is moved an equal amount toward the closed position.

Turning to FIG. 4B, when control enters at point 534, the controller determines (step 538) whether the cooling costs $\Delta\$_{COOL}$ required to cool the supply air within chamber 206 to the desired level (when outside air is increased incrementally) exceeds the costs $\Delta\$_{PP}$ of operating the pony pack to remove contaminants from the return air (when outside air is minimized). If the cooling cost exceeds the cost of operating the pony pack, control passes to step 544 at which the outside air damper 216 is closed and the damper 242 is set to admit the minimum level of outside air. Thereafter, the pony pack dampers 242 and 244 are set such that the pony pack fan operates to deliver desired air flow (normally maximum design flow) through the filter 240 and processes the minimum amount of outdoor air with the balance made up of return air (step 546). Returning to step 538, if the cooling costs $\Delta\$_{COOL}$ is below the costs of operating the pony pack $\Delta\$_{PP}$, flow passes to step 540 at which the outside air damper 216 is modulated based on a PID algorithm (such as explained above). The damper 216 is modulated to its optimal setting based upon this algorithm. Thereafter, the controller determines whether the outside air damper is set to a 100% open position (step 542). If the outside air damper 216 is 100% open, the damper 242 is opened and the damper 244 is closed and the pony pack fan is run at desired air flow (step 543). Otherwise, control returns to the starting point 500.

As in the first embodiment, the controller 229 performs a separate processing sequence to control the damper settings based upon the $CO_2$ levels within the return air and within the outside air. In particular, with reference to FIG. 4B, the controller compares the return air $CO_2$ level to that of the outside air (step 536). If the return air $CO_2$ level does not exceed a set level (e.g., 1000 ppm) and does not exceed that of the outside air by a previously specified amount (e.g., 500 ppm), the controller merely returns to the starting point 500. Otherwise, the controller moves to step 540 to modulate the output air damper 216 according to the PID algorithm. Thereafter, step 542 is repeated as explained above. The controller 229 may be arranged to perform the $CO_2$ testing prior to or subsequent to the processing flow of FIG. 4A. Alternatively, the controller 229 may represent a multiprocessor and be configured to perform the $CO_2$ testing in parallel with the processing sequence of FIG. 4A.

As is clear from the foregoing detailed explanation, the inventive control system minimizes energy consumption of the conditioning system by adjusting damper settings based upon outside and return air enthalpy, contaminants (e.g., VOC levels) within the outside and return air, and upon $CO_2$ levels therein. The controller determines whether it is feasible to reduce the amount of outside air to a minimum and instead modulate the dampers to direct return air through the gas phase and contaminant filter media or, alternatively, to open the outside air damper to admit additional outside air in order to dilute the indoor air concentration of contaminants.

FIG. 5 illustrates a processing sequence which may be followed by the controller 29 to obtain the percent change %$\Delta$OA in the outside air damper and the percent change %$\Delta$cfm$_{FLTR}$ in the filter damper position. The process of FIG. 5 may be used when the system operates under steady state conditions. As explained above, these percentage changes %$\Delta$OA and %$\Delta$cfm$_{FLTR}$ may be independently obtained by a PID algorithm, fuzzy logic and the like. Alternatively, these percentages may be set to preset values, or set to maintain a specific relation to one another (i.e. a 20% change in outside air corresponds to a 20% change in filtration). As a further alternative, the percentage change in outside air may be determined by the PID algorithm or the fuzzy logic and, thereafter, the percentage change in filtration (%$\Delta$cfm$_{FLTR}$) may be automatically obtained based on a known ratio between the percentage changes %$\Delta$OA and %$\Delta$cfm$_{FLTR}$. This ratio may be calculated periodically based on measured values for the system. This percentage change would identify an incremental amount of outside air $\Delta$cfm$_{OA}$ which would provide an amount of dilution within the building equivalent to a change in the amount of filtration $\Delta$cfm$_{FLTR}$. For instance, a 10% increase in outside air may be equivalent in dilution to a 5% increase in filtration (such as when the outside air is average quality). Divergently, a 10% increase in outside air may be equivalent to a 20% increase in filtration when the outside air is of high quality.

FIG. 5 illustrates the processing sequence which may be undergone to obtain this equivalency ratio. At preset points throughout operation, such as at a start up time in each morning, the controller establishes an initial equivalency ratio of 1 to 1 and resets the outside air damper to admit a minimum amount of outside air and the filtration damper to admit a desired percentage of mixed air (step 300). The percentage to which the filtration damper is opened may be any initial desired percentage, such as 20% and the like. At start up, the controller 29 also reads the return, outside and discharge air qualities and enthalpies. These qualities and enthalpies are stored in memory as the "previous" qualities. Once the damper is open by the predefined percentage, the conditioning unit is operated for a fixed interval of time (15 minutes and the like). Thereafter, the controller reads the new outside, return and discharge air qualities and enthalpies (step 304). Next, the controller calculates the percentage improvement in the return air quality and stores this improvement within the equivalency ratio upon the side thereof corresponding to filtration. This percentage improvement is based upon the previous air quality reading for the return air and the current return air quality reading (measured in steps 301 and 304, respectively). Thereafter, the outside air and filtration dampers are readjusted, such that the filtration damper is completely closed and the outside air damper is increased by a percentage (above the minimum acceptable amount of outside air) equal to the percentage change in the filtration damper (step 308). In this manner, the outside air damper is opened by an amount, such as 20%, equal to the amount that the filtration damper was opened in step 301. Next, the controller operates the conditioning unit at the current settings for the predetermined fixed period of time (step 310) and re-reads the outside, return and supply air qualities and enthalpies (step 312). Next, in step 314, the percentage improvement in the return air is calculated and stored within the equivalency ratio on the side thereof corresponding to an increase in outside air.

By way of example, assume that the air quality is measured on a scale of 0 to 100 with 0 representing very good quality and 100 representing very bad quality. Further assume that the equivalency ratio is initially set to 1:1 and that the filtration damper is initially set to admit 20% of the mixed air therethrough (in step 301). Further assume that the return air quality at steps 300, 304 and 312 are read to equal 60, 40 and 10, respectively. Based upon these return air quality readings, the controller determines that a filtration increment of 20% achieves a 20 point improvement in the return air quality. Thus, this improvement is placed upon the side of the equivalency ratio corresponding to filtration. The controller further concludes, in step 314, that a 20% increase in outside air provides a 30 point improvement in return air quality. Thus, the controller stores the 30 point improvement upon the side of the equivalency ratio corresponding to outside air (i.e., the equivalency ratio equals 20:30 or 2:3).

Thereafter, when the incremental increase in outside air %$\Delta$OA is determined based upon a PID algorithm, the controller utilizes the equivalency ratio to determine an equivalent percentage change in the filtration damper %$\Delta$cfm$_{FLTR}$. If the equivalency ratio is 2:3 F:OA; then a 30% increase in the outside air damper corresponds to a 20% increase in the filtration damper. The controller may recalculate the equivalency ratio at periodic times throughout the day.

The controller may further initiate each day's operation with an equivalency ratio for a similar period of time for a previous day, or a similar period of time for the same day of the previous week, thus utilizing the same equivalency ratio for each Monday morning rush hour and the like.

As a further alternative, when in a non-steady state application, the improvement achieved by the filter may be instantaneously calculated by opening the filter damper to filter 100% of the mixed air. The controller reads the quality of the filtered air and uses this reading as the fixed air quality leaving the filter. This fixed air quality is used in the equivalency ratio when determining the %Δcfm$_{FLTR}$ that is equivalent to the %Δ in outside air.

For example, if the air passing through the filter has an effective cleanliness rating of 20 points on a VOC or other air quality sensor scale which rates air cleanliness on a rating of 0 for perfect air quality and 100 for extremely dirty air quality, and the current outdoor air has a rating of 10, the controller would require twice as large of an increment of air to pass through the filter to equal an increment of dilution through the use of outside air.

The controller determines the incremental amount of outside air to be added or the incremental amount of mixed air to be filtered based upon a continual process for measuring the difference between the return air quality rating and the desired return air quality rating.

Generally, the "base" increment for increases in outside air or filtration is calculated on the ability of the filter to remove contaminants. This base increment can be established by opening the face damper to filter 100% of the mixed air and measuring the air quality of the supply air after it passes through the filter. This quality is compared with the air quality of the mixed air prior to filtration to achieve a filtration efficiency. This filtration efficiency is used to obtain the base increment with which the filter is adjusted. The controller can be programmed to reestablish the base increment at any pre-timed interval, such as daily, weekly or monthly.

Figure 6:
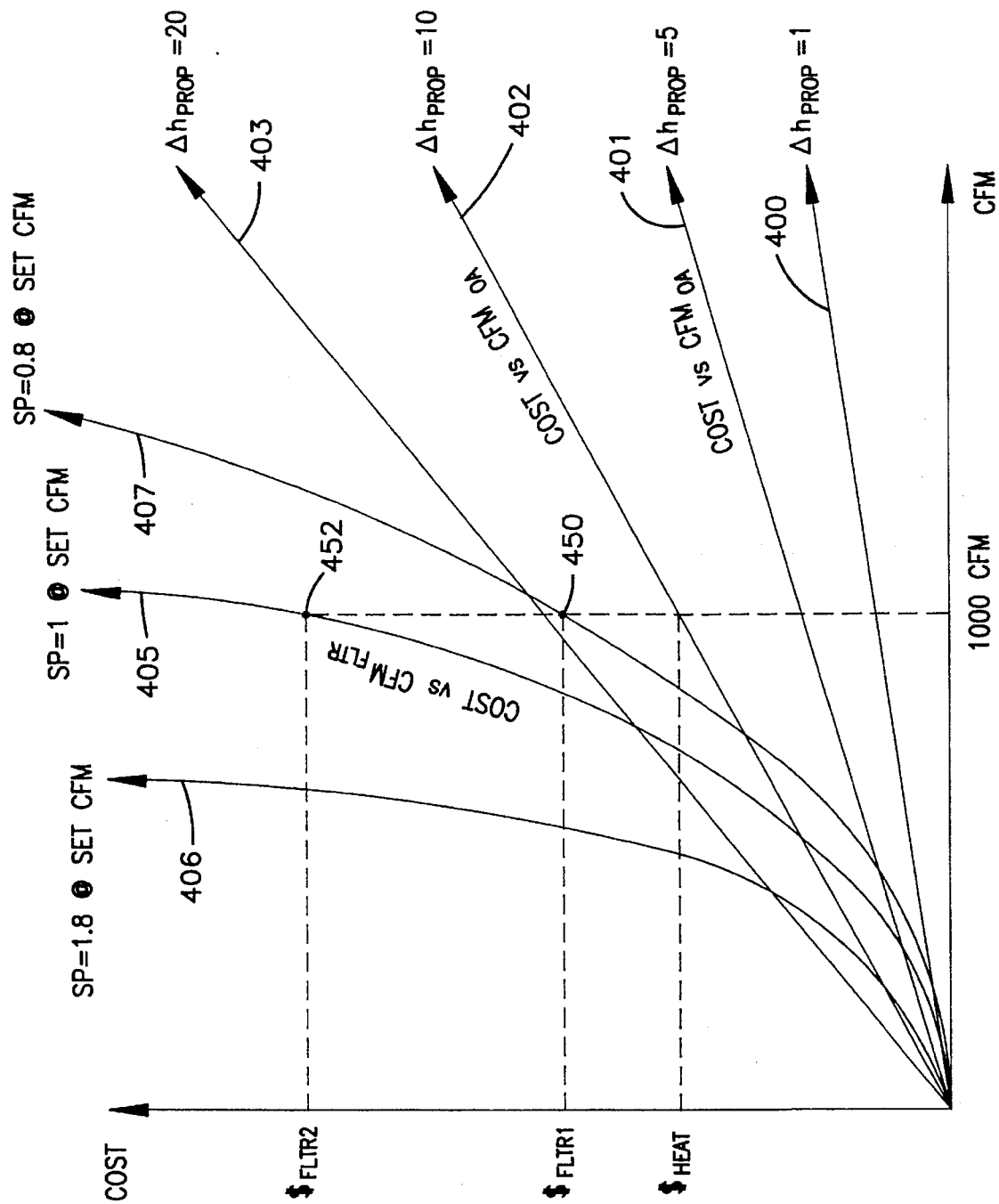
FIG. 6 illustrates a look up table to be utilized to calculate the cooling/heating costs and the filtration costs for a given flow of cfm of outside air.

FIG. 6 illustrates a look up table which may be utilized to calculate the cost associated with a given amount of air flow through the filter and a given amount of outside air. Within FIG. 6, lines 400–403 represent linear curves identifying a relation between cost and outside air flow. Each of lines 400–403 correspond to a different enthalpy differential between the return and outside air. For instance, if the enthalpy differential equals 10, the cost analysis associated with heating and cooling such air would be based upon line 402. Similarly, if the enthalpy differential equals 1, the cost associated with heating additional outside air would be calculated based upon the linear curve 400.

Curves 405–407 represent the relationship between cost and the air flow through the filter. Each of curves 405–407 correspond to a different filter type and/or characteristic. For instance, as a filter becomes plugged up, the pressure differential thereacross increases, thereby adjusting the cost versus cfm$_{FLTR}$ curve associated therewith. Similarly, different types of filters exhibit different pressure drops thereacross and similarly have different cost curves. The filter cost curve 405–407 may be calculated by measuring the static pressure drop across the filter at a given flow of cfm therethrough (i.e., set cfm). In the example of FIG. 6, line 405 corresponds to the cost associated with a static pressure of one inch across a filter when the set cfm is passed therethrough. Similarly, lot curves 406 and 407 correspond to static pressure drops of 1.8 and 0.8 inches at the set cfm level, respectively. The filter cost curves include replacement cost and energy cost. Thus, the curve becomes steeper as the replacement cost increases.

As previously noted, the controller may initially obtain the equivalency ratio by setting the filter to filter 100% of the incoming air and by reading the filtered or discharge air quality Q-FLTR and the outside air quality Q-OA. When the filter is open 00%, the discharge air quality represents the best air quality capable of being output by the current filter. The equivalency represents a relation between the best air quality achievable by the filter (Q-FLTR) and the outside air quality (Q-OA) (i.e., (Q-FLTR)/(Q-OA). This equivalency ratio may be used within FIGS. 3A–4B to obtain the percentage change in outside air %ΔOA when the percentage change in filtration %Δcfm$_{FLTR}$ is generated by a PID algorithm or fuzzy logic. Similarly, the equivalency ratio may be used to calculate the percentage change in filtration %Δcfm$_{FLTR}$ once the PID/fuzzy logic obtains a percentage change in outside air %ΔOA. The equivalency ratio may also be used in the follow alternative system for calculating costs for heating, cooling and filtration.

FIG. 7 illustrates an alternative method, such as used in steps 112, 122, 512 and 522, for calculating the filtering costs (replacement and fan energy) and the energy costs for maintaining the enthalpy level of the mixed air at the setpoint. The method of FIG. 7 compares absolute costs, not the incremental costs. The absolute filtration costs equals the total costs associated with filtering (i.e., cfm$_{fltr}$) including the costs associated with the percentage change Δcfm$_{fltr}$ in filtration plus the costs associated with the current mixed air being filtered cfm$_{CFLTR}$. The absolute heating/cooling costs equals the costs associated with the percentage change %ΔOA in outside air plus the costs associated with the current outside air flow cfm$_{COA}$.

In this alternative method, when processing flow reaches step 112 and 138, control passed to FIG. 7. First, the controller gets the current equivalency ratio (Q-FLTR)/(Q-OA), and the percentage change in filtration (as obtained in step 111) %Δcfm$_{FLTR}$. The controller also obtains the pressure drop ASP across the filter at the design or maximum air flow. The design pressure drop ASP may be obtained during a start up routine or periodically by setting the filter damper to a design setting and measuring the pressure drop thereacross.

Next, the controller obtains the enthalpy differential Δh between the outside air enthalpy and the return air enthalpy. The percentage change in filtered air flow %Δcfm$_{FLTR}$ and the current filtration air flow cfm$_{FLTR}$ are used in step 406 to calculate the total air flow cfm$_{FLTR}$ which will pass through the filter once the filter damper is adjusted by the preferred percentage change %Δcfm$_{FLTR}$. At step 408, the controller uses the look up table to obtain a total costs associated with filtration if the filter is adjusted to filter cfm$_{FLTR}$ of air. The total filtration cost is obtained (as illustrated in FIG. 6) by using pressure drop ASP to locate the proper filtration cost curve 405–507 and by using the total filter air flow cfm$_{FLTR}$ to locate the corresponding cost upon the curve. For example, assume the ΔSP=0.8 and the cfm$_{FLTR}$ equals 1000. Thus, the look up table of FIG. 6 will be accessed and filtration curve 407 will be used to provide a total filtration cost \$$_{FLTR1}$ (at point 450). Divergently, if the ΔSP equaled 1 inch, filtration curve 405 would be used and the filtration cost would equal \$$_{FLTR2}$ (at point 452).

Next, the controller obtains the appropriate enthalpy line Δh$_{prop}$ to be used based on the equation Δh/(Eq Ratio); wherein Δh represents the enthalpy value obtained in step 402 and Eq Ratio represent the equivalency ratio obtained in step 400. The $\Delta h_{prop}$ identifies an enthalpy line that has been proportionally adjusted via the equivalency ratio to be equivalent to the filtration curve. Next, the controller accessed the lookup table again to obtain the total cost for heating the outside air $cfm_{OA}$. TO do so, the controller obtains the proper enthalpy line 400–403 based on the enthalpy difference $\Delta h_{prop}$. The controller then locates the cost point upon the line $\Delta h_{prop}$ for the current flow of filtered air $cfm_{FLTR}$.

For instance, if the outside and return air enthalpies equal 30 and 10 respectively, and the Eq Ratio is 2:1, the enthalpy difference $\Delta h_{prop}$ will equal 10 (i.e., (30−10)/2). Thus, line 402 is used within the lookup table. If 1000 cfm of filtered air are used, the cost of using outside air will equal $\$_{HEAT}$.

In step 414, the $\$_{HEAT}$ cost for heating the outside air is cheaper than the cost of filter 1000 cfm $\$_{FLTR1}$. The foregoing analysis is equally applicable to calculating the cost of cooling.

Alternatively, when the percentage change in outside air AOA is obtained in step 109 via the PID algorithm, the process of FIG. 7 may be repeated by removing the variables $\%\Delta cfm_{FLTR}$, $\Delta SP$, $\Delta h$, $cfm_{FLTR}$, and $\Delta h_{prop}$ and replacing these variables with the variables $\%\Delta OA$, $\Delta h$, $\Delta SP$, $cfm_{OA}$, and $\Delta SP_{prop}$, respectively. The cost calculates in steps 408 and 412 are interchanged. Thus, the percentage change in outside air and the change in enthalpy are obtained in step 402. The change in static pressure is obtained in step 404. The new total outside air is obtained in step 406. The enthalpy cost of maintaining the enthalpy of the mixed air at the set point is obtained from the enthalpy lines in step 408. The proportional change in static pressure $\Delta SP_{prop}$ is obtained in step 410 (i.e., $\Delta SP/(Eq\ Ratio)$). Finally, the filtering cost is obtained in step 412.

During operation, the controller is able to set the filter to pass the set amount of cfm and measure the static pressure drop thereacross. From this measurement, the controller is able to calculate the corresponding curve 405–407 to be used. The controller further calculates the cost curve for outside air 400–403 based upon the enthalpy of the outside air. Once these curves have been identified, the controller is able to use a look up table containing the corresponding cost values for a given cfm of outside air or a cfm of filtration.

As a further alternative, a flow measurement sensor may be included and the controllers operations based thereon to calculate the optimal sequence of damper settings based on the above variables plus filtering costs (i.e., pressure drop, fan horsepower and filter replacement cost), versus energy costs of heating or cooling the added air brought in for dilution.

Optionally, air quality control module which may be implemented with the controller. The air quality control module includes a $CO_2$ monitor and a VOC monitor. A pump is included which draws air in through an inlet port and discharges such air via a discharge port. First and second solenoid valves are connected in series with the inlet port of the pump. The solenoid valves each include one normally closed inlet port and one normally open inlet port and one discharge port. The first inlet ports are connected to a ventilation tube which delivers outside air to the port. The second inlet ports are connected to a conduit which delivers return air to the port and to a conduit which draws upon supply air within the intake chamber. The discharge port of the secondary solenoid valve delivers its output to the inlet port of the first solenoid valve. The discharge port of the first solenoid valve delivers its output to the inlet port upon the pump.

The first and second solenoid valves are controlled, via the controller, to selectively deliver one of the supply air, return air and outside air to the pump. This quantity of air is sampled to determine the level of contaminants therein including the $CO_2$ level and the VOC level.

During operation, the air sampling pump runs continuously whenever the unit is turned on. The sampling pump begins 30 minutes before any scheduled start up time of the conditioning unit. A selector within the controller selectively operates the solenoid valves in order to selectively deliver supply, return and outside air separately to the monitoring system. Each air source is sequentially read and the controller logs outside air quality (i.e., $CO_2$ level and VOC contaminants). The controller sequentially reads and logs outside air quality for selected gaseous contaminants by energizing the selected solenoid valves and reading the air quality sensors after allowing for the sampling chamber to be flushed. The controller reads the air quality once the sensor has stabilized (which typically occurs at 10 minute intervals). When no solenoids are energized, the controller samples the outdoor air. If the first solenoid is energized, the return air is sampled. When both solenoids are energized, the supply air is sampled. The data read from the air quality sensors in the module is read by the controller and used for IEQ control.

In addition, the inventive system may optionally include a ventilation control module which guarantees that the return and outside air dampers are set to ensure that the minimum amount of outside air is forced into the intake chamber, even during low system air flow. The ventilation control module maintains this minimum outside air flow rate by overriding the return air damper as necessary to force additional outside air into the system.

An integral face and bypass coil section may be provided to assure freeze protection when the system requires a high percentage of outside air, while the outside air temperature is quite low.

The selector and controller sample and log outside, return and supply air qualities so that the integrated controller 29 can determine, based on operating cost and current air quality, whether the best course of action is to increase or decrease the amount of outdoor air, and whether to direct the air through or around the gas phase/particulate filtration system.

As is clear from the foregoing description the inventive system allow the user to achieve optimum air quality by comparing the costs associated with filtration with the costs associated with introducing additional outside air to dilute the contaminates within the building. The filtration costs may include power costs and replacement/filter wear costs. The user may adjust the relative weight of each factor upon the determination depending upon which of power costs and replacement costs is of more concern. For instance, if the power consumption during filtration is cheap or free this factor would weight very little in the foregoing determination. Alternatively, if the filter replacement costs are of more concern, this factor could be set to weight more heavily within the determination.

As explained above, the preferred percentage changes in air flow through the filter damper $\%cfm_{FLTR}$ and the outside air damper $\%cfm_{OA}$ may be set at fixed values for each iteration through the processing sequence of FIGS. 3A–4B. However, these percentage changes may be varied between iterations depending upon the air quality of the outside and return air and the relation therebetween. The outside air may have bad quality during rush hour (if the building is located in a high traffic area), while the outside air may have good quality at night. In such situations, during rush hour 40% of additional outside air may be needed to achieve the same result as 10% of additional outside air during non-rush hour or at night. In this situation, the outside air damper is adjusted based on the outside air quality and the filter damper is adjusted based upon the filtering efficiency of the filtration system.

For instance, for the following example, assume that the outside and return air may have good, average or bad quality. When the outside air has good quality and the return has bad quality, the outside air damper may be opened during a single iteration by a small percentage change (10%). However, if the outside air quality is average while the return air quality is bad, the outside air damper may be opened during a single iteration by a medium percentage (25%). Further, if the outside air quality is bad (but better than the minimum standard), and the return air quality is worse than the minimum standard, the outside air damper may be opened during a single iteration by a large percentage (40%). Thus, the amount of variation in the outside air damper may be determined based on the outside and return air qualities.

The percentage change in the filter damper may also be obtained based on the return air quality and the filter efficiency. This independent change accounts for the fact that a filtration system may improve the air quality of a given volume of air at a different rate than an equal volume of additional outside air. For instance, 10% of the mixed air may need to pass through the filter to create the same supply air quality as would be achieved if an additional 30% of outside air were added.

It is to be understood that the constant K adjusts for air density variation and the that the foregoing equations are based on standard air density. The controller will compensate, within every equation, for any variations from the standard air density to correct for altitude and temperature.

The inventive system may optionally provide for such control by including exhaust relief and minimum outside air control to maintain minimum positive building pressure.

Optionally, once the actual total preferred amount of outside air $cfm_{POA}$ is obtained, the controller may next calculate the amount of outside air that can be introduced through the damper 30 without necessitating the use of the heating coil. The calculation for $cfm_{MOA}$ is optional since, in the above example, the economizer cycle sets the outside air flow to equal the maximum outside air flow usable while maintaining the mixed air temperature setpoint. In such a situation, the outside air flow measured between steps 106 and 110 would equal this maximum. However, if the economizer cycle does not set the outside air flow to this maximum $cfm_{MOA}$ then the maximum must be calculated based on the equation $$(cfm_{MOA})(t_{OA})+(cfm_{MA}-cfm_{OA})(t_{RA})=(cfm_{MA})(t_{MA}),$$

where $cfm_{MOA}$ represents the maximum cfm of outside air that may be introduced without using the heating coil capacity to maintain the supply air temperature at or above a predefined set point $t_{SA}$. In this equation, the temperature of the supply air $t_{SA}$ is set to equal the predefined set point, such as 50° F. In this optional situation, the maximum outside air flow would be subtracted from the total preferred outside air flow before determining whether the heating coil capacity is sufficient in step 110.

Optionally, the energy calculations performed above in connection with heating outside air may be based upon enthalpy, instead of temperature. This enthalpy calculation is used when, in the winter, it is desirable to increase the humidity of the supply or discharge air. Thus, outside air admitted to the system must be heated and increased in humidity. Accordingly, the calculations performed in steps 110 and 112 are modified to account for enthalpy changes and enthalpy differentials between the enthalpy set point $h_{MA-SET}$ and the resulting mixed air enthalpy $h_{MA-RES}$. These enthalpy calculations may be conducted in a manner similar to that performed in step 138 to calculate the enthalpy variation corresponding to a cooling operation. This enthalpy calculation will account for the cost of humidifying dry outside air.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. An air conditioning unit comprising:

a housing having an inlet opening and a discharge opening;

a filtration system, positioned within said housing, for filtering supply air traveling through a first passageway between the inlet and discharge openings, said filtration system having means for removing volatile organic compounds from said supply air;

a fan mounted within said housing for directing inlet air into the unit through said inlet opening and discharge air, out of said unit, through said discharge opening;

a bypass for routing inlet air through a second passageway between said inlet and discharge openings bypassing said filtration system; and a flow control device for controlling a percentage of said inlet air passed through each of said first and second passageways based upon a quality of said inlet air.

2. The invention of claim 1, wherein said flow control device comprises a first section for regulating flow of said supply air through said filtration system in said first passageway and a second section for regulating flow of said supply air through said second passageway bypassing the filtration system, said first and second passageways receiving 100% of the inlet air.

3. The invention of claim 1, including an air quality detector operably coupled with said flow control device, said flow control device automatically adjusting an amount of inlet air passed through each of said first and second passageways in response to supply air filtration requirements determined by said detector.

4. The invention of claim 1, wherein said inlet opening includes return and outside air ports for receiving return and outside air, respectively, said flow control device further including flow control dampers proximate said return and outside air ports for controlling an amount of air passed through associated ports.

5. The invention of claim 1, wherein said filtration system comprises at least one of a high capacity mechanical filter, high capacity adsorptive filtration system and a gas phase filter.

6. The invention of claim 1, further comprising means for determining an incremental filtration cost corresponding to an incremental increase in an amount of inlet air passed through said first passageway and through said filtration system, said flow control device admitting said incremental increase of inlet air through said filtration system when said incremental filtration cost falls below a predefined level.

7. The invention of claim 1, said inlet air comprising outside and return air, said unit further comprising means for determining an incremental energy cost corresponding to an incremental increase in an amount of outside air admitted to form said inlet air, said flow control device maintaining said percentage of inlet air passed through each of said first and second passageways constant and admitting said incremental increase of outside air when said incremental energy cost falls below a predefined level.

8. The invention of claim 1, said inlet air comprising outside and return air, said unit further comprising:

means for determining a dilution preferred percentage change in an amount of outside air admitted and a filtration preferred percentage change in an amount of inlet air passed through said first passageway and said filtration system, and means for adjusting said unit based upon one of said filtration and dilution preferred percentage changes depending upon a quality of said outside air.

9. An air conditioning unit comprising:

a housing having an inlet opening and a discharge opening;

a filtration system, positioned within said housing, for filtering supply air traveling through a first passageway between the inlet and discharge openings;

a fan mounted within said housing for directing inlet air into the unit through said inlet opening and discharge air, out of said unit, through the discharge opening;

a bypass for routing inlet air through a second passageway between said inlet and discharge openings bypassing said filtration system;

a flow control device for controlling a percentage of said inlet air passed through each of said first and second passageways based upon a quality of said inlet air; and means for determining an incremental filtration cost corresponding to an incremental increase in an amount of inlet air passed through said first passageway and through said filtration system, said flow control device admitting said incremental increase of inlet air through said filtration system when said incremental filtration cost falls below a predefined level.

10. An air conditioning unit comprising:

a housing having an inlet opening and a discharge opening;

a filtration system, positioned within said housing, for filtering supply air traveling through a first passageway between the inlet and discharge openings;

a fan mounted within said housing for directing inlet air, comprised of outside and return air, into the unit through said inlet opening and discharge air, out of the unit, through the discharge opening;

a bypass for routing inlet air through a second passageway between said inlet and discharge openings bypassing said filtration system;

a flow control device for controlling a percentage of said inlet air passed through each of said first and second passageways based upon a quality of said inlet air;

means for determining a dilution preferred percentage change in an amount of outside air admitted and a filtration preferred percentage change in an amount of inlet air passed through said first passageway and said filtration system; and means for adjusting said unit based upon one of said filtration and dilution preferred percentage changes depending upon a quality of said outside air.

11. An air conditioning unit comprising:

a housing having an inlet opening and a discharge opening;

a filtration system, positioned within said housing, for filtering supply air traveling through a first passageway between the inlet and discharge openings;

a fan mounted within said housing for directing inlet air, comprised of outside and return air, into the unit through said inlet opening and discharge air, out of the unit, through the discharge opening;

a bypass for routing inlet air through a second passageway between said inlet and discharge openings bypassing said filtration system;

a flow control device for controlling a percentage of said inlet air passed through each of said first and second passageways based upon a quality of said inlet air; and means for determining an incremental energy cost corresponding to an incremental increase in an amount of outside air admitted to form said inlet air, said flow control device maintaining said percentage of inlet air, passed through each of said first and second passageways, constant and admitting said incremental increase of outside air when said incremental energy cost falls below a predefined level.

12. An air conditioning unit comprising:

a housing having an inlet opening and a discharge opening;

a filtration system, positioned within said housing, for filtering supply air traveling through a first passageway between the inlet and discharge openings;

a fan mounted within said housing for directing inlet air into the unit through said inlet opening and discharge air, out of the unit, through the discharge opening;

a bypass for routing inlet air through a second passageway between said inlet and discharge openings bypassing said filtration system; and a flow control device for dividing flow of said inlet air between said first and second passageways in proportion to a seused quality of said inlet air, wherein said first passageway receives a first percentage of said inlet air and said second passageway receives a second percentage of said inlet air.

13. The invention of claim 12, including an air quality detector operably coupled with said flow control device, said flow control device automatically adjusting an amount of inlet air passed through each of said first and second passageways in response to supply air filtration requirements defined by said detector.

* * * * *